(12) United States Patent
Youn et al.

(10) Patent No.: US 12,061,817 B2
(45) Date of Patent: Aug. 13, 2024

(54) INTEGRATED CIRCUIT MEMORY DEVICES WITH ENHANCED BUFFER MEMORY UTILIZATION DURING READ AND WRITE OPERATIONS AND METHODS OF OPERATING SAME

(71) Applicant: SAMSUNG ELECTRONICS CO., LTD., Suwon-si (KR)

(72) Inventors: Eung-Jun Youn, Suwon-si (KR); Bum-Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/369,606

(22) Filed: Jul. 7, 2021

(65) Prior Publication Data

US 2021/0334037 A1    Oct. 28, 2021

Related U.S. Application Data

(63) Continuation of application No. 16/117,295, filed on Aug. 30, 2018, now Pat. No. 11,086,561.

(30) Foreign Application Priority Data

Jan. 22, 2018    (KR) .................... 10-2018-0007894

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,983,023 A | 11/1999 | Moriwaki et al. | |
| 6,079,046 A | 6/2000 | Tamura et al. | |
| 6,832,340 B2 | 12/2004 | Larson et al. | |
| 7,493,531 B2 | 2/2009 | Ito et al. | |

(Continued)

FOREIGN PATENT DOCUMENTS

| | | |
|---|---|---|
| CN | 101856912 A | 10/2010 |
| CN | 102541983 A | 7/2012 |

(Continued)

*Primary Examiner* — Sanjiv Shah
*Assistant Examiner* — Alexander J Yoon
(74) *Attorney, Agent, or Firm* — Myers Bigel, P.A.

(57) ABSTRACT

An integrated circuit device includes a nonvolatile memory, first and second buffer memories, and a controller. Each of the first and second buffer memories is configured to buffer write data to be written to the nonvolatile memory in response to a write request and also buffer read data received from the nonvolatile memory in response to a read request. A controller is provided, which evaluates the first buffer memory against at least one criterion relating to data accuracy. The controller is configured to: redirect at least some of the write data from the first buffer memory to the second buffer memory in response to the write request when the evaluation demonstrates the criterion has been exceeded, and redirect at least some of the read data from the first buffer memory to the second buffer memory in response to the read request when the evaluation demonstrates the criterion has been exceeded.

15 Claims, 23 Drawing Sheets

(56) References Cited

U.S. PATENT DOCUMENTS

| | | |
|---|---|---|
| 7,793,150 B1 * | 9/2010 | Boucher ............ G06F 11/0706 714/16 |
| 7,809,920 B2 | 10/2010 | Watanabe et al. |
| 7,913,039 B2 | 3/2011 | Yagisawa et al. |
| 7,917,688 B2 | 3/2011 | Tanaka et al. |
| 8,015,438 B2 | 9/2011 | Bruennert et al. |
| 8,060,797 B2 | 11/2011 | Hida et al. |
| 8,209,363 B2 | 6/2012 | Palthepu et al. |
| 8,583,972 B2 | 11/2013 | Hida et al. |
| 8,638,602 B1 | 1/2014 | Horn |
| 8,782,326 B2 | 7/2014 | Kosugi |
| 8,848,471 B2 | 9/2014 | Franceschini et al. |
| 9,294,826 B2 | 3/2016 | Kataoka et al. |
| 9,361,221 B1 | 6/2016 | Kankani et al. |
| 9,727,412 B2 | 8/2017 | Son et al. |
| 9,747,158 B1 | 8/2017 | Kannan et al. |
| 10,120,794 B2 | 11/2018 | Shin |
| 10,127,104 B2 | 11/2018 | Honma |
| 10,176,886 B1 * | 1/2019 | Spencer ............. G06F 11/1012 |
| 10,359,949 B2 | 7/2019 | Seroff et al. |
| 2004/0128363 A1 * | 7/2004 | Yamagami ........... H04L 12/145 709/217 |
| 2006/0092828 A1 * | 5/2006 | Aoki ..................... G06F 11/201 370/216 |
| 2008/0072116 A1 | 3/2008 | Brittain et al. |
| 2009/0013127 A1 | 1/2009 | Atkinson |
| 2009/0094320 A1 | 4/2009 | Palthepu et al. |
| 2009/0161466 A1 | 6/2009 | Hamilton et al. |
| 2009/0217281 A1 * | 8/2009 | Borkenhagen ...... G06F 11/1048 718/104 |
| 2010/0268851 A1 * | 10/2010 | Bauman .............. G06F 11/2007 710/11 |
| 2011/0022801 A1 * | 1/2011 | Flynn .................... G06F 11/108 711/120 |
| 2012/0079171 A1 | 3/2012 | Ju et al. |
| 2012/0124414 A1 * | 5/2012 | Dallas ................... H04L 41/069 714/E11.095 |
| 2013/0138870 A1 | 5/2013 | Yoon et al. |
| 2013/0227347 A1 | 8/2013 | Cho et al. |
| 2013/0246847 A1 | 9/2013 | Yu |
| 2014/0189204 A1 | 7/2014 | Sugimoto et al. |
| 2015/0242144 A1 | 8/2015 | Saito |
| 2015/0309872 A1 | 10/2015 | Cai et al. |
| 2015/0363261 A1 | 12/2015 | Warnes et al. |
| 2016/0034327 A1 | 2/2016 | Kim |
| 2016/0132388 A1 | 5/2016 | Kim |
| 2016/0365138 A1 | 12/2016 | Cho |
| 2018/0090218 A1 * | 3/2018 | Takada ............... G11C 16/0483 |
| 2018/0349035 A1 * | 12/2018 | Ellis ........................ G06F 3/061 |

FOREIGN PATENT DOCUMENTS

| | | |
|---|---|---|
| CN | 103092764 A | 5/2013 |
| CN | 103137199 A | 6/2013 |
| CN | 104254986 A | 12/2014 |
| CN | 105518800 A | 4/2016 |
| CN | 105786403 A | 7/2016 |
| JP | 3746319 B2 | 12/2005 |
| JP | 2007213381 A | 8/2007 |
| JP | 2008171163 A | 7/2008 |
| JP | 2010250511 A | 11/2010 |
| JP | 2013120426 A | 6/2013 |
| JP | 2013165386 A | 8/2013 |
| JP | 2017157257 A | 9/2017 |
| KR | 101351550 B1 | 1/2014 |
| WO | 2014103489 A1 | 7/2014 |

* cited by examiner

INTEGRATED CIRCUIT MEMORY DEVICES WITH ENHANCED BUFFER MEMORY UTILIZATION DURING READ AND WRITE OPERATIONS AND METHODS OF OPERATING SAME

REFERENCE TO PRIORITY APPLICATIONS

This application is a continuation of U.S. patent application Ser. No. 16/117,295, filed Aug. 30, 2018, which itself claims priority to Korean Patent Application No. 10-2018-0007894, filed Jan. 22, 2018, the disclosures of both of which are hereby incorporated herein in their entireties by reference.

BACKGROUND

The inventive concept relates to integrated circuit devices and, more particularly, to integrated circuit memory devices and methods of operating the same.

Recently, storage devices, such as solid state drives (SSD), are widely used. A storage device may include, for example, a nonvolatile memory, such as a flash memory, and a controller controlling the nonvolatile memory. The controller may include, for example, an internal memory, such as static random access memory (SRAM). As input/output speeds of the storage device are increased and storage capacity is increased, capacity and functions of the internal memory included in the controller are increasing. In response, soft errors may occur in the internal memory, and thus, the reliability of the storage device may deteriorate.

SUMMARY

According to an aspect of the inventive concept, there is provided a storage device including a nonvolatile memory and a controller, which includes a first memory that buffers write data to be written on the nonvolatile memory or buffers read data read from the nonvolatile memory. The controller is configured to dynamically determine a buffer memory for buffering the write data or the read data based on the number of error bits generated in the first memory or a generation frequency of the error bits. A second memory is also provided, which is configured to buffer the write data or the read data when the number of error bits or the generation frequency of the error bits is equal to or higher than a threshold value.

According to another aspect of the inventive concept, there is provided a storage device including: a nonvolatile memory; and a controller including a memory including a buffering region for buffering write data to be written on the nonvolatile memory or read data read from the nonvolatile memory, wherein the controller is configured to dynamically determine a rewrite cycle with respect to a read-only region of the memory based on the number of error bits generated in the buffering region or a generation frequency of the error bits, and dynamically control a rewrite operation with respect to the read-only region according to the determined rewrite cycle.

According to another aspect of the inventive concept, there is provided a method of operating a storage device including a nonvolatile memory and a controller configured to control the nonvolatile memory. This method may include: monitoring, by the controller, the number of error bits generated in a first memory included in the controller or a generation frequency of the error bits; comparing, by the controller, the number of error bits or the generation frequency of the error bits to a threshold value; buffering, on a second memory provided outside the controller, write data to be written on the nonvolatile memory or read data read from the nonvolatile memory when the number of error bits or the generation frequency of the error bits is equal to or higher than the threshold value; and buffering the write data or the read data on the first memory when the number of error bits or the generation frequency of the error bits is lower than the threshold value.

According to another aspect of the inventive concept, there is provided a method of operating a storage device including a nonvolatile memory and a controller configured to control the nonvolatile memory. This method may include: monitoring, by the controller, the number of error bits generated in a buffering region of a memory included in the controller or a generation frequency of the error bits; dynamically determining, by the controller, a rewrite cycle with respect to a read-only region of the memory based on the number of error bits or the generation frequency of the error bits; and dynamically controlling, by the controller, a rewrite operation with respect to the read-only region according to the rewrite cycle.

According to a further embodiment of the invention, an integrated circuit device may include a nonvolatile memory, a first buffer memory, a second buffer memory, and a controller. The first buffer memory may be configured (as a primary buffer memory) to buffer write data to be written to the nonvolatile memory in response to a write request and also buffer read data received from the nonvolatile memory in response to a read request, respectively. A second buffer memory may also be configured (as a backup buffer memory) to buffer write data to be written to the nonvolatile memory in response to a write request and also buffer read data received from the nonvolatile memory in response to a read request, respectively. A controller is also provided, which is coupled to the first and second buffer memories. The controller is configured to evaluate the first buffer memory against at least one criterion relating to accuracy of data stored therein. The controller is also configured to: (i) redirect at least some of the write data from the first buffer memory to the second buffer memory in response to the write request when the evaluation demonstrates that the criterion has been exceeded, and (ii) redirect at least some of the read data from the first buffer memory to the second buffer memory in response to the read request when the evaluation demonstrates that the criterion has been exceeded. In some of these embodiments of the invention, the at least one criterion is a function of a number of erroneous data bits stored within the first buffer memory or is a function of an error bit generation frequency within the first buffer memory. The controller may also include a buffer manager, which is configured to evaluate the first buffer memory against the at least one criterion, and an error check and correction (ECC) module, which is configured to check and correct errors in data stored in the first buffer memory.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
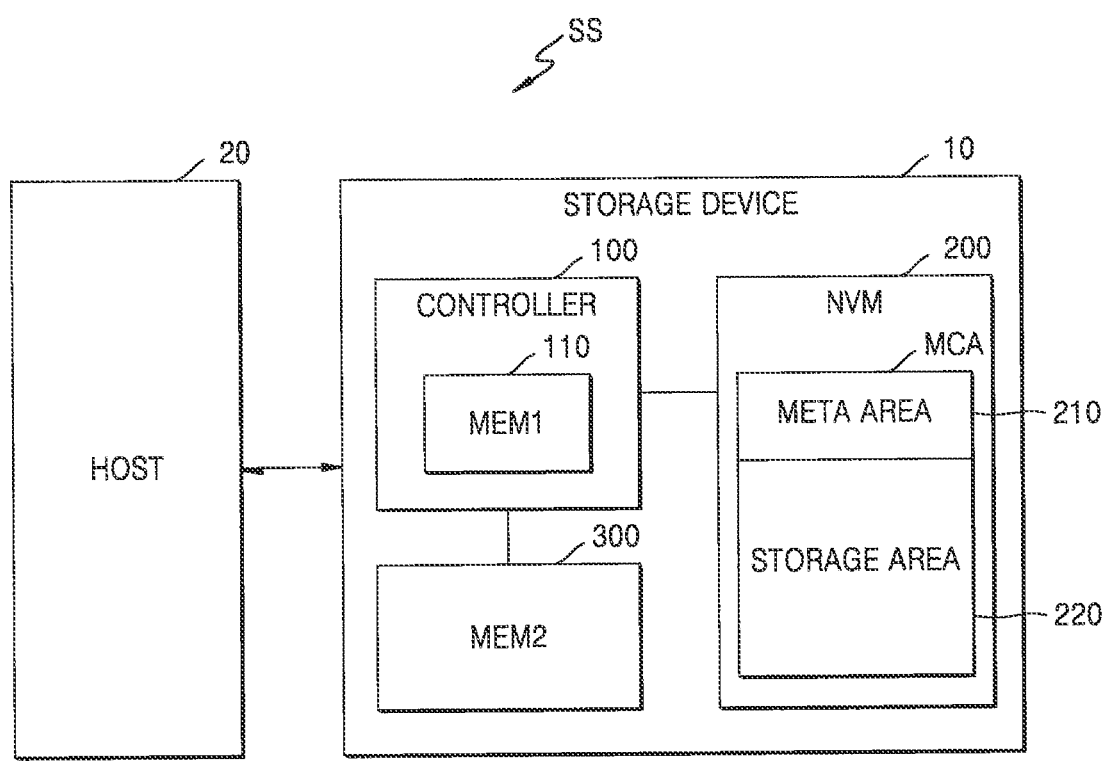
FIG. 1 is a block diagram of an integrated circuit memory device, which operates as a storage system according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIG. 1, a storage system SS according to an embodiment of the invention may include a storage device 10 and a host 20, and the storage device 10 may include a controller 100, which contains a first memory (MEM1) 110, a nonvolatile memory (NVM) 200 and a second memory (MEM2) 300. The first memory 110 extends within the controller 100 and the second memory 300 may be provided outside the controller 100. Some embodiments, the storage device 10 may be referred to as an "integrated circuit device".

The host 20 may communicate with the storage device 10 through various interfaces, and transmit a write request or a read request to the storage device 10. For example, the host 20 may be embodied as an application processor (AP) or a system-on-chip (SoC). The host 20 may transmit the write request to the storage device 10, and the storage device 10 may write data on the NVM 200 in response to the write request. The host 20 may transmit the read request to the storage device 10, and the storage device 10 may read data from the NVM 200 in response to the read request.

The controller 100 may control the NVM 200 to write data on the NVM 200 in response to the write request received from the host 20, or read data from the NVM 200 in response to the read request received from the host 20. The first memory 110 may buffer write data to be written to the NVM 200 or read data received from the NVM 200. For example, the first memory 110 may be static random access memory (SRAM) or any other type of volatile or nonvolatile memory.

With the increase in an input/output (I/O) speed and storage capacity of the storage device 10, capacity and functions of the first memory 110 included in the controller 100 are enhanced. For example, the first memory 110 may be SRAM, and the SRAM may have a higher soft error rate (SER) relative to a dynamic random access memory (DRAM). In particular, the SER of SRAM may increase when a data I/O speed is increased or the altitude of a usage environment is increased. Accordingly, a bit flip of data stored in SRAM may be generated, and as a result, reliability of the storage device 10 may deteriorate. According to one or more embodiments, in order to prevent the reliability of the storage device 10 from deteriorating, the controller 100 may monitor a bit flip (i.e., error bits) generated in the first memory 110, and dynamically control operations related to the first memory 110 according to the monitored error bit.

According to an embodiment, the controller 100 may dynamically determine a buffer memory for buffering the write data or the read data based on the number of error bits generated in the first memory 110 or a generation frequency of the error bits. In detail, the controller 100 may compare the number of error bits generated in the first memory 110 or the generation frequency of the error bits to a threshold value, determine the first memory 110 as the buffer memory when the number or generation frequency of the error bits is lower than the threshold value, and determine the second memory 300 as the buffer memory when the number or generation frequency of the error bits is equal to or higher than the threshold value.

According to an embodiment, the controller 100 may monitor an I/O speed of the write data or the read data, and dynamically determine the buffer memory for buffering the write data or the read data based on the I/O speed. For example, the controller 100 may monitor the I/O speed of the write data or the read data based on an I/O speed of data buffered into the first memory 110. In detail, the controller 100 may compare the I/O speed to a threshold speed, determine the first memory 110 as the buffer memory when the I/O speed is lower than the threshold speed, and determine the second memory 300 as the buffer memory when the I/O speed is equal to or higher than the threshold speed.

According to an embodiment, the controller 100 may dynamically determine a rewrite cycle with respect to a read-only region included in the first memory 110 based on the number or generation frequency of the error bits generated in the first memory 110, and control a rewrite operation with respect to the read-only region according to the determined rewrite cycle. In detail, the controller 100 may decrease the rewrite cycle when the number or generation frequency of the error bits is equal to or higher than the threshold value, and accordingly, increase the number of times the rewrite operation is performed with respect to the read-only region.

According to an embodiment, the controller 100 may dynamically determine the rewrite cycle with respect to the read-only region included in the first memory 110 based on the I/O speed of the write data or the read data, and control the rewrite operation with respect to the read-only region according to the determined rewrite cycle. In detail, the controller 100 may decrease the rewrite cycle when the I/O speed is equal to or higher than the threshold speed, and accordingly, increase the number of times the rewrite operation is performed with respect to the read-only region.

According to an embodiment, the controller 100 may evaluate the first buffer memory 110 against at least one criterion relating to accuracy of data stored therein. The controller 100 may (i) redirect at least some of the write data from the first memory 110 to the second memory 300 in response to the write request when the evaluation demonstrates that the criterion has been exceeded, and (ii) redirect at least some of the read data from the first memory 110 to the second memory 300 in response to the read request when the evaluation demonstrates that the criterion has been exceeded.

According to an embodiment, the second memory 300 may buffer the write data or the read data when the number or generation frequency of the error bits generated in the first memory 110 is equal to or higher than the threshold value. According to an embodiment, the second memory 300 may buffer the write data or the read data when the I/O speed of the write data or read data is equal to or higher than the threshold speed. For example, the second memory 300 may be DRAM, but is not limited thereto, and may be any type of volatile or nonvolatile memory. According to some embodiments, the second memory 300 may even be implemented within the hardware of the controller 100, and not as a separate memory as illustrated by FIG. 1.

The NVM 200 may include a memory cell array MCA including a plurality of memory cells, and the memory cell array MCA may include a meta area 210 for storing metadata and a storage area 220 for storing user data. According to an embodiment, the NVM 200 may include a flash memory device, such as a NAND flash memory device. Alternatively, in other embodiments of the invention, the NVM 200 may include a low-resistive memory device, such as resistive RAM (ReRAM), phase change RAM (PRAM), or magnetic RAM (MRAM), for example.

In some embodiments of the invention, the storage system SS may be embodied as a personal computer (PC), a data server, network-attached storage, an Internet of Things (IoT) device, or a portable electronic device, for example. Examples of the portable electronic device include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, and an wearable device.

According to some embodiments, the storage device 10 may be an internal memory embodied in an electronic device. For example, the storage device 10 may be a solid-state drive (SSD), an embedded universal flash storage (UFS) memory device, or an embedded multi-media card (eMMC). According to some embodiments, the storage device 10 may be an external memory detachably attached to an electronic device. For example, the storage device 10 may be a UFS memory card, a compact flash (CF) card, a secure digital (SD) card, a micro-SD card, a mini-SD card, an extreme digital (xD) card, or a memory stick.

Figure 2A:
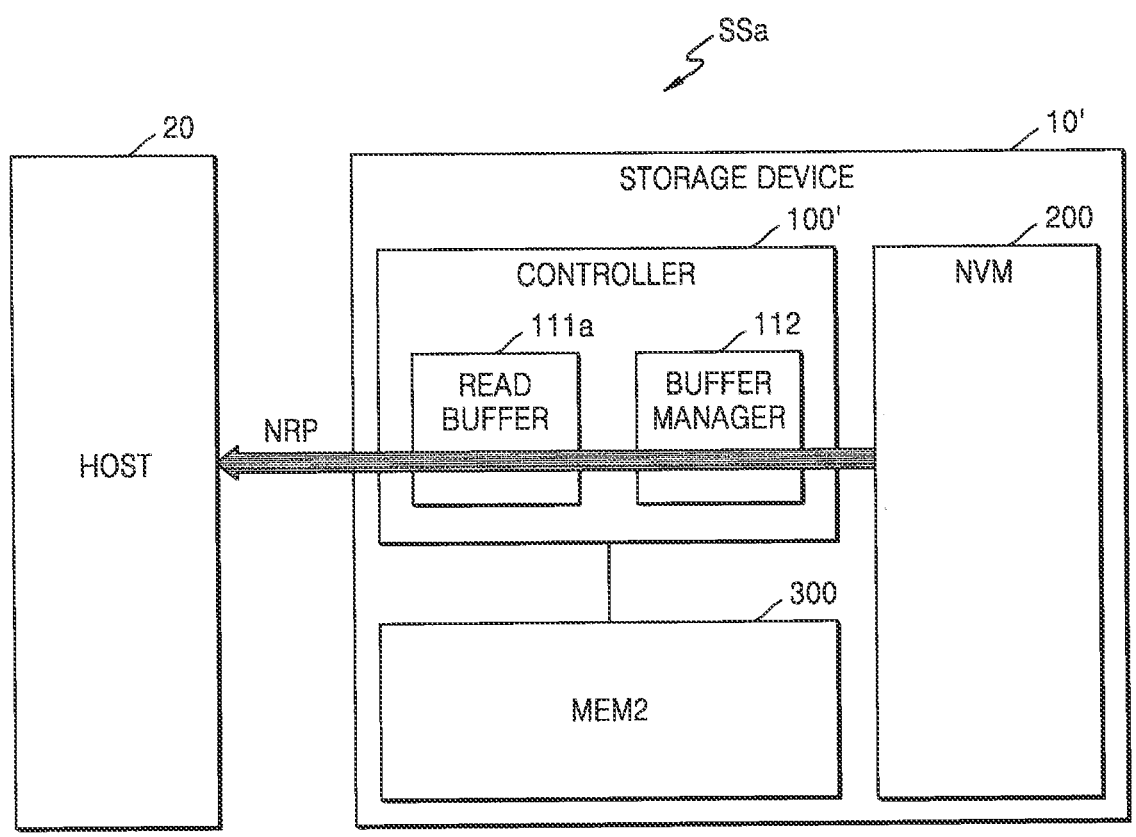
FIG. 2A illustrates a normal read path of a storage system, according to an embodiment of the invention.
Figure 2B:
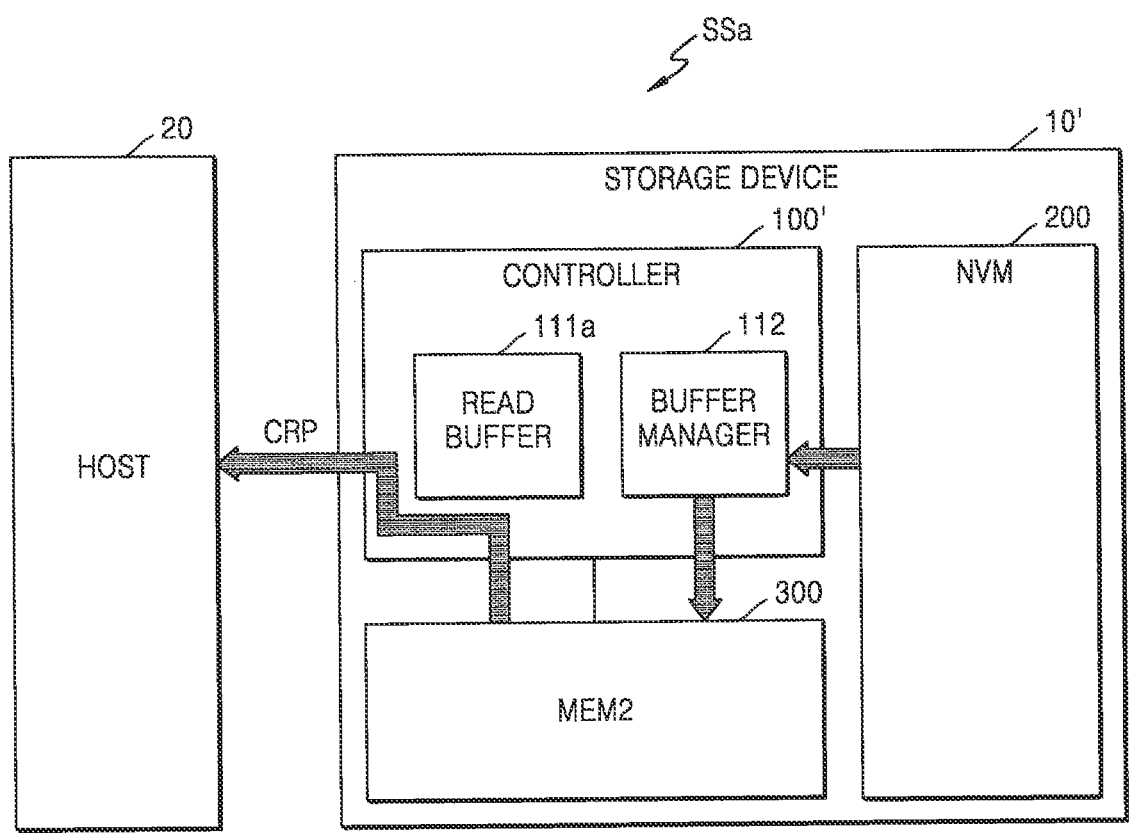
FIG. 2B illustrates a corrected read path of a storage system, according to an embodiment of the invention.

FIG. 2A illustrates a normal read path NRP of a storage system SSa, according to an embodiment of the invention, whereas FIG. 2B illustrates a corrected read path CRP of the storage system SSa, according to another embodiment of the invention. Referring to FIGS. 2A and 2B, the storage system SSa may include a storage device 10' and the host 20, and the storage device 10' may include a controller 100', the NVM 200, and the second memory 300. The controller 100' may include a read buffer 111a and a buffer manager 112. The read buffer 111a may correspond to an example of the first memory 110 of FIG. 1, and in detail, may correspond to a partial region of the first memory 110.

The buffer manager 112 may compare the number of error bits generated in the read buffer 111a or a generation frequency of the error bits to a threshold value, and determine whether the read buffer 111a or the second memory 300 should be used as a buffer memory based on a comparison result. According to an embodiment, the buffer manager 112 may be embodied in software and/or firmware, and may be loaded to the first memory 110. Alternatively, in some embodiments of the invention, the buffer manager 112 may be embodied exclusively in hardware.

According to an embodiment, the buffer manager 112 may determine the read buffer 111a as the buffer memory when the number of error bits generated in the read buffer 111a is lower than a threshold number, and in this case, a read path may correspond to the normal read path NRP of FIG. 2A. Then, when the number of error bits generated in the read buffer 111a increases to be equal to or higher than the threshold number, the buffer manager 112 may change the buffer memory to the second memory 300, and in this case, the read path may be changed to the corrected read path CRP of FIG. 2B.

According to an embodiment, the buffer manager 112 may determine the second memory 300 as the buffer memory when the number of error bits generated in the read buffer 111a is equal to or higher than the threshold number, and in this case, the read path may correspond to the corrected read path CRP of FIG. 2B. Then, when the number of error bits generated in the read buffer 111a decreases to be lower than the threshold number, the buffer manager 112 may change the buffer memory back to the read buffer 111a, and at this time, the read path may be changed to the normal read path NRP of FIG. 2A.

Figure 3A:
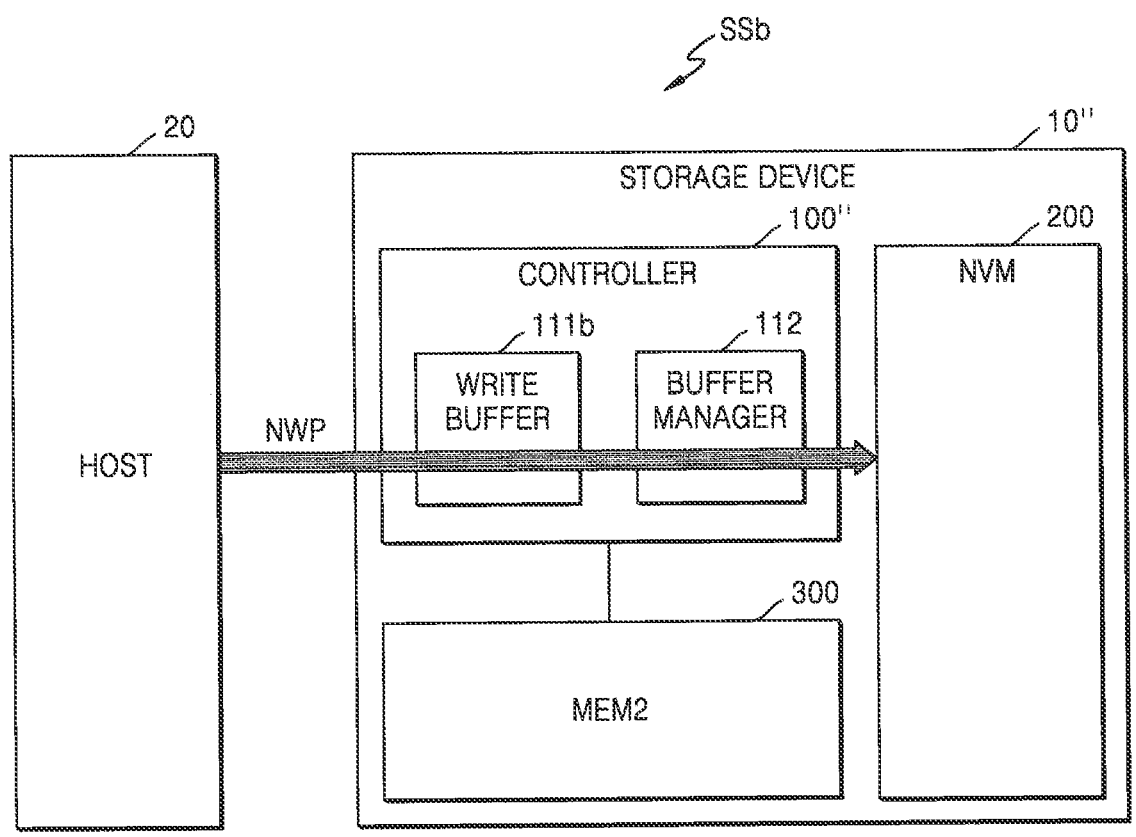
FIG. 3A illustrates a normal writing path of a storage system, according to an embodiment of the invention.
Figure 3B:
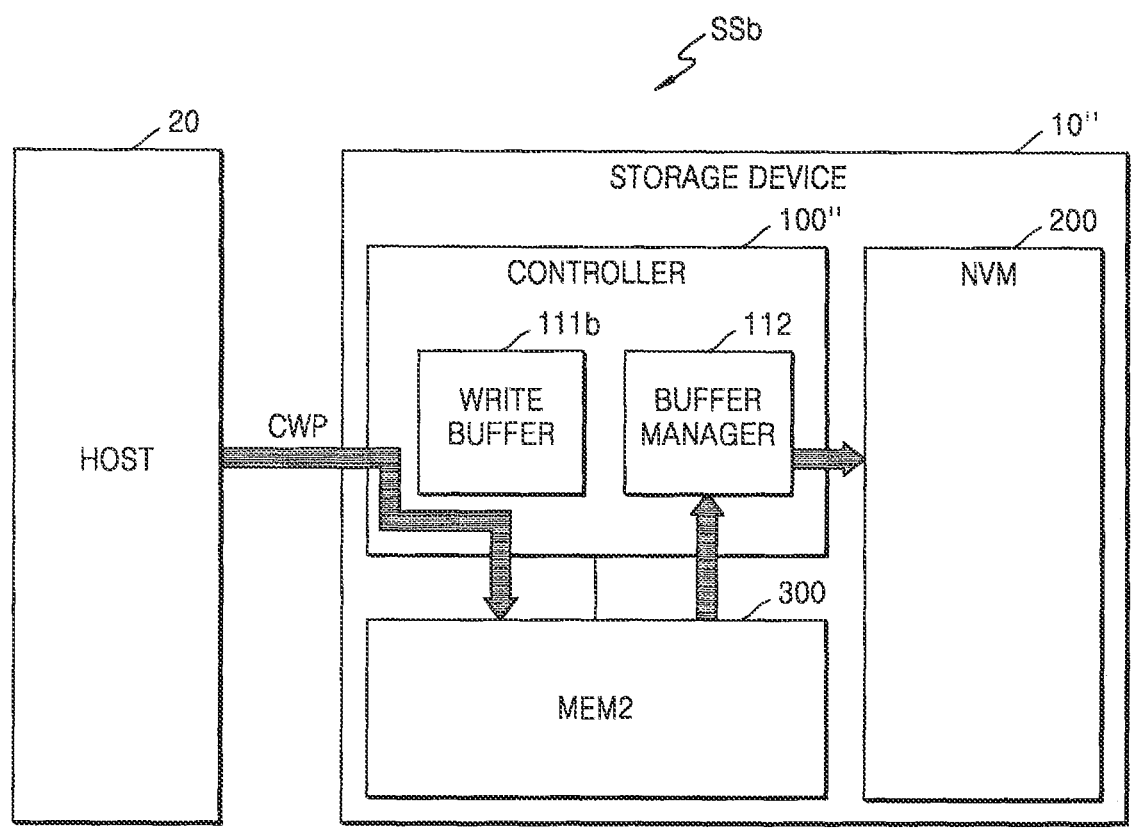
FIG. 3B illustrates a corrected writing path of a storage system, according to an embodiment of the invention.

FIG. 3A illustrates a normal writing path NWP of a storage system SSb, according to an embodiment of the invention, and FIG. 3B illustrates a corrected writing path CWP of the storage system SSb, according to another embodiment of the invention. Referring to FIGS. 3A and 3B, the storage system SSb may include a storage device 10" and the host 20, and the storage device 10" may include a controller 100", the NVM 200, and the second memory 300. The controller 100" may include a write buffer 111b and the buffer manager 112. The write buffer 111b may correspond to an example of the first memory 110 of FIG. 1, and in detail, may correspond to a partial region of the first memory 110.

The buffer manager 112 may compare the number of error bits generated in the write buffer 111b, and determine the write buffer 111b or the second memory 300 as a buffer memory based on a comparison result. According to an embodiment, the buffer manager 112 may be embodied in software and/or firmware, and may be loaded to the first memory 110 of FIG. 1. However, according to alternative embodiments of the invention, buffer manager 112 may be embodied in hardware.

In some embodiments of the invention, the buffer manager 112 may determine the write buffer 111b as the buffer memory when the number of error bits generated in the write buffer 111b is lower than a threshold number. When this determination is made, the write path may correspond to the normal write path NWP of FIG. 3A. However, the buffer manager 112 may change the buffer memory to the second memory 300 when the number of error bits generated in the write buffer 111b increases to be equal to or higher than the threshold number. When this alternative determination is made, the write path may be changed to the corrected write path CWP of FIG. 3B. Nonetheless, the buffer manager 112 may change the buffer memory back to the write buffer 111b when the number of error bits generated in the write buffer 111b decreases to be lower than the threshold number. When this happens, the write path may be changed back to the normal write path NWP of FIG. 3A.

Figure 4:
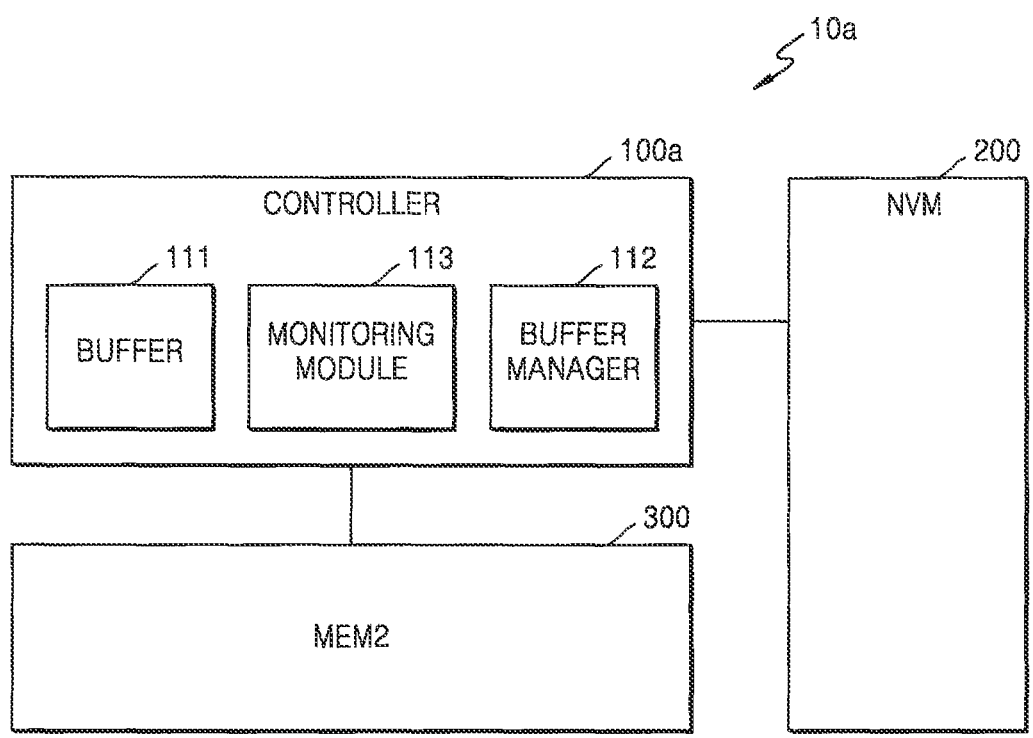
FIG. 4 is a block diagram of a storage device according to an embodiment of the invention.

FIG. 4 is a block diagram of a storage device 10a according to another embodiment of the invention. Referring to FIG. 4, the storage device 10a may include a controller 100a, a NVM 200, and a second memory 300. The controller 100a may include a buffer 111, the buffer manager 112, and a monitoring module 113. The buffer 111 may buffer write data to be written on the NVM 200 or read data read from the NVM 200. The storage device 10a according to the embodiment of FIG. 4 may correspond to an example of the storage device 10 of FIG. 1. Accordingly, details which overlap those described above with reference to FIGS. 1 through 3B may not be provided again here.

According to the embodiment of FIG. 4, the monitoring module 113 may monitor error bits generated in the buffer 111. For example, the monitoring module 113 may monitor the number of error bits by comparing data input to the buffer 111 to data output from the buffer 111. For example, the monitoring module 113 may be embodied to include an error status register recording the monitored number of error bits.

Here, the buffer manager 112 may receive the number of error bits from the monitoring module 113, compare the received number of error bits to a threshold number, and determine the buffer 111 or the second memory 300 as a buffer memory based on a comparison result. Then, the buffer manager 112 may change the buffer memory when a value recorded in the error status register reaches the threshold number.

According to an embodiment of the invention, the monitoring module 113 may monitor a data I/O speed based on the data input to the buffer 111 and the data output from the buffer 111. For example, the monitoring module 113 may be embodied to include an I/O speed register recording the monitored data I/O speed. For example, the monitoring module 113 may monitor a maximum data usage rate, and may be embodied to include a maximum data usage rate register recording the monitored maximum data usage rate.

Here, the buffer manager 112 may receive the data I/O speed from the monitoring module 113, compare the received data I/O speed to a threshold speed, and determine the buffer 111 or the second memory 300 as the buffer memory based on a comparison result. Based on this configuration, the buffer manager 112 may change the buffer memory when a value recorded in the I/O speed register or the maximum data usage rate register reaches the threshold speed.

Figure 5:
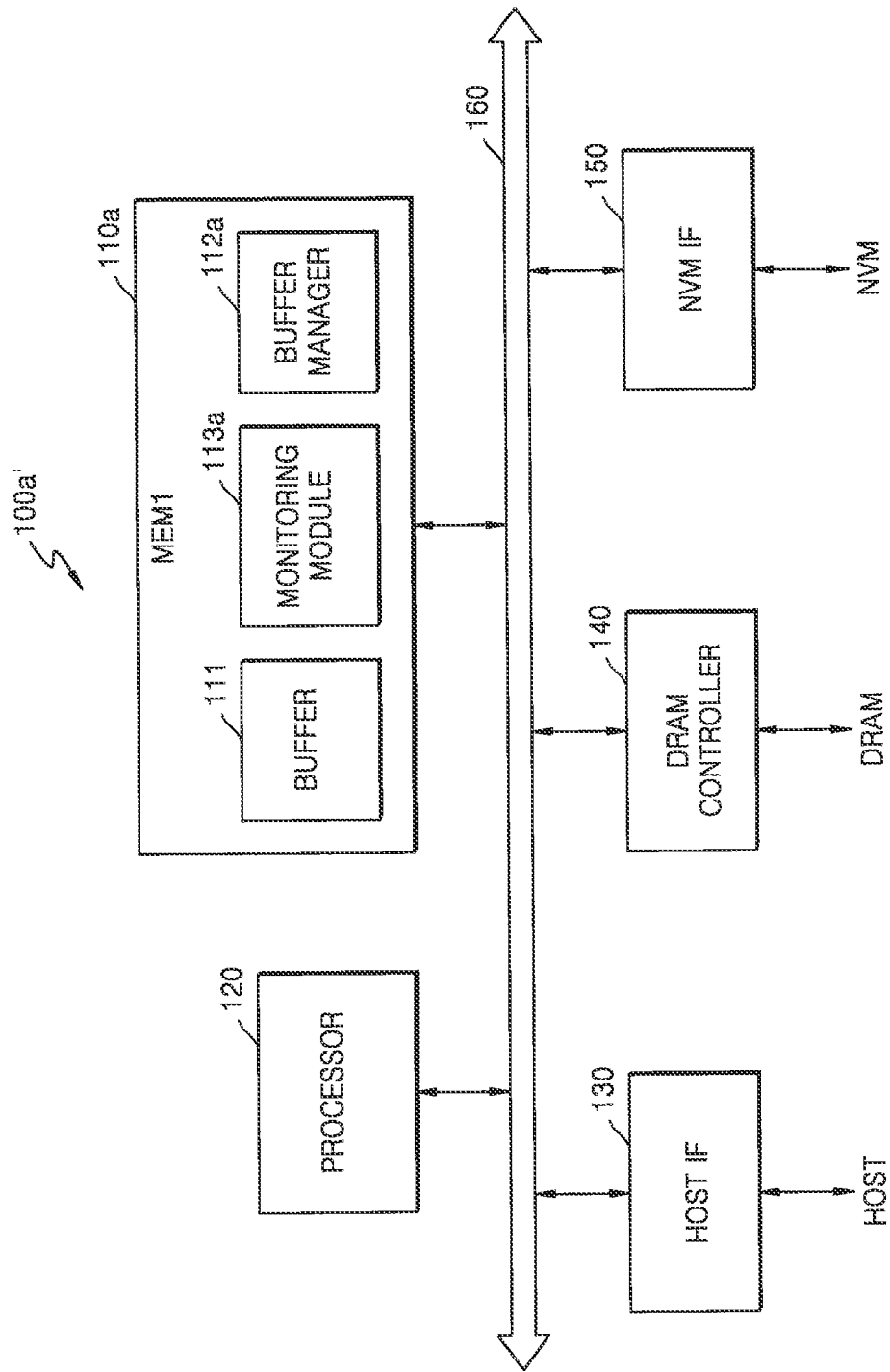
FIG. 5 is a block diagram illustrating in detail an example of a controller of FIG. 4, according to an embodiment of the invention.

FIG. 5 is a block diagram illustrating, in detail, a controller 100a', which may be an example of the controller 100a of FIG. 4, according to an embodiment of the invention. Referring to FIG. 5, the controller 100a' may include a first memory 110a, a processor 120, a host interface 130, a DRAM controller 140, and an NVM interface 150, which communicate with each other through a bus 160. For example, when the second memory 300 of FIG. 4 is configured as a DRAM, the controller 100a' may include the DRAM controller 140 for controlling the DRAM.

The processor 120 may include a central processing unit (CPU) or a micro-processor, and control overall operations of the controller 100a'. According to an embodiment, the processor 120 may be embodied as a signal core processor, or as a multi-core processor, such as a dual core processor or a quad core processor. The first memory 110a operates according to control of the processor 120, and may be used as an operation memory, a buffer memory, or a cache memory. For example, the first memory 110a may be embodied as a volatile memory, such as DRAM or SRAM, or as a NVM, such as PRAM or a flash memory.

A buffer manager 112a and a monitoring module 113a may be loaded onto the first memory 110a. The buffer manager 112a and the monitoring module 113a may be embodied as firmware or software, and loaded onto the first memory 110a. The buffer manager 112a may correspond to an example of the buffer manager 112 of FIG. 4, and the monitoring module 113a may correspond to an example of the monitoring module 113 of FIG. 4. The first memory 110a may include the buffer 111, and the buffer 111 may be used as a write buffer or a read buffer.

The host interface 130 may provide an interface between a host (for example, the host 20 of FIG. 10) and the controller 100a'. This interface may be provided according to interface technologies, such as universal serial bus (USB), MMC, peripheral component interconnect-express (PCI-E), AT attachment (ATA), serial AT attachment (SATA), parallel AT attachment (PATA), small computer system interface (SCSI), serial attached SCSI (SAS), enhanced small disk interface (ESDI), or integrated drive electronics (IDE).

As shown, the NVM interface 150 may provide an interface between the controller 100a' and the NVM 200. For example, metadata, such as a mapping table, write data, and read data, may be exchanged between the controller 100a' and the NVM 200 through the NVM interface 150. According to an embodiment, the number of NVM interfaces 150 may correspond to the number of NVM chips included in the storage device 10a or the number of channels between the controller 100a' and the NVM 200.

Figure 6:
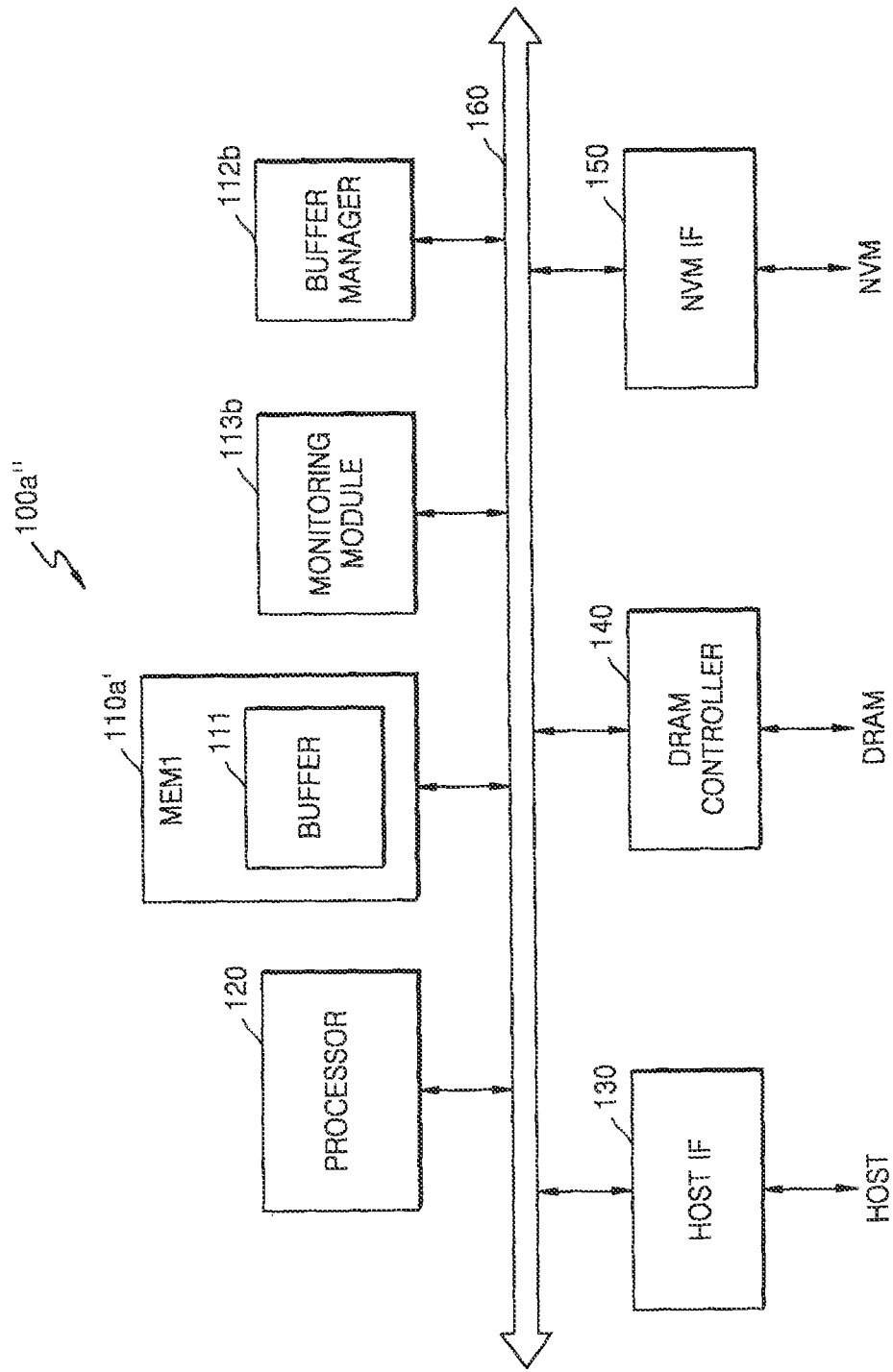
FIG. 6 is a block diagram illustrating in detail an example of the controller of FIG. 4, according to another embodiment of the invention.

FIG. 6 is a block diagram illustrating in detail a controller 100a", which is an embodiment of the controller 100a of FIG. 4, according to another embodiment of the invention. Referring to FIG. 6, the controller 100a" may include a first memory 110a', the processor 120, a buffer manager 112b, a monitoring module 113b, the host interface 130, the DRAM controller 140, and the NVM interface 150, which communicate with each other through the bus 160. The controller 100a" according to the current embodiment may correspond to a modified example of the controller 100a' of FIG. 5, and thus redundant details are not provided again herein.

The first memory 110a' may include the buffer 111, and the buffer 111 may be used as a write buffer or a read buffer. The buffer manager 112b and the monitoring module 113b may be embodied as hardware, and accordingly, may be provided outside the first memory 110a'. The buffer manager 112b may correspond to an example of the buffer manager 112 of FIG. 4, and the monitoring module 113b may correspond to an example of the monitoring module 113 of FIG. 4.

Figure 7:
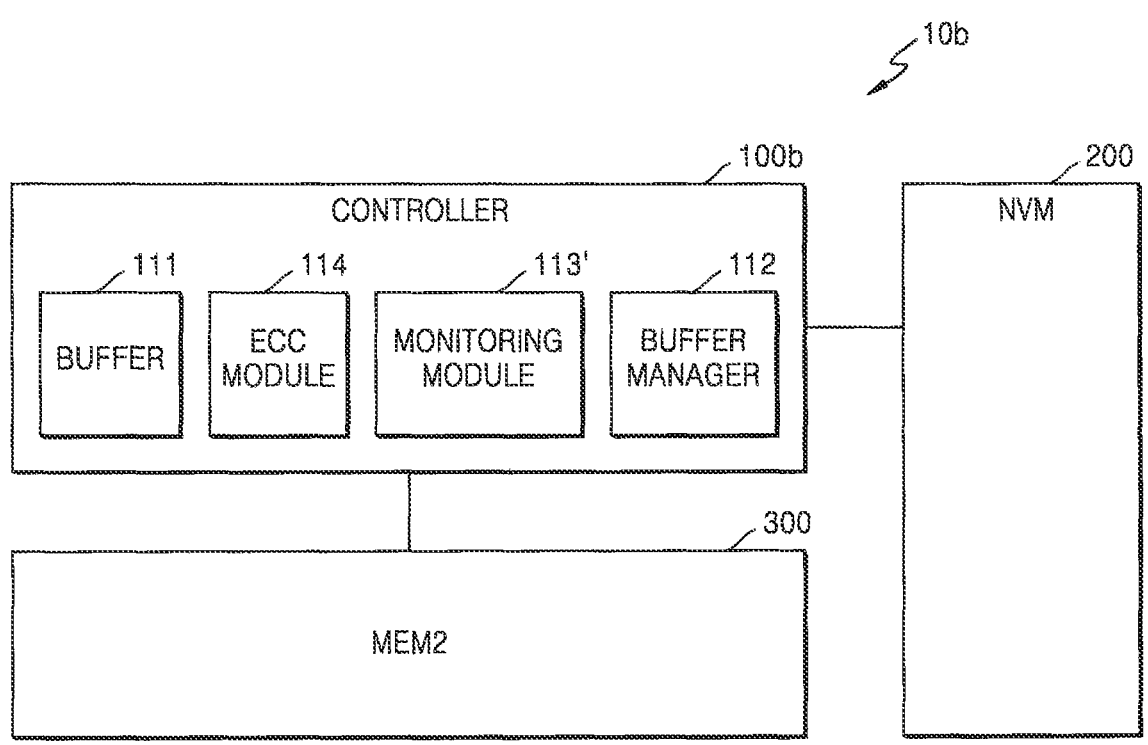
FIG. 7 is a block diagram of a storage device according to another embodiment of the invention.

Referring now to FIG. 7, a storage device 10b according to another embodiment of the invention may include a controller 100b, the NVM 200, and the second memory 300. As shown, the controller 100b may include the buffer 111, the buffer manager 112, a monitoring module 113', and an error check and correction (ECC) module 114. The storage device 10b according to the current embodiment may correspond to a modified example of the storage device 10a of FIG. 4, and thus redundant details may not be provided again herein.

The ECC module 114 may perform an ECC operation on data buffered into the buffer 111. The monitoring module 113' may monitor the number of error bits generated in the buffer 111 based on an error corrected by the ECC module 114. The buffer manager 112 may receive the number of error bits from the monitoring module 113', compare the received number of error bits to a threshold number, and determine the buffer 111 or the second memory 300 as a buffer memory based on a comparison result.

Figure 8:
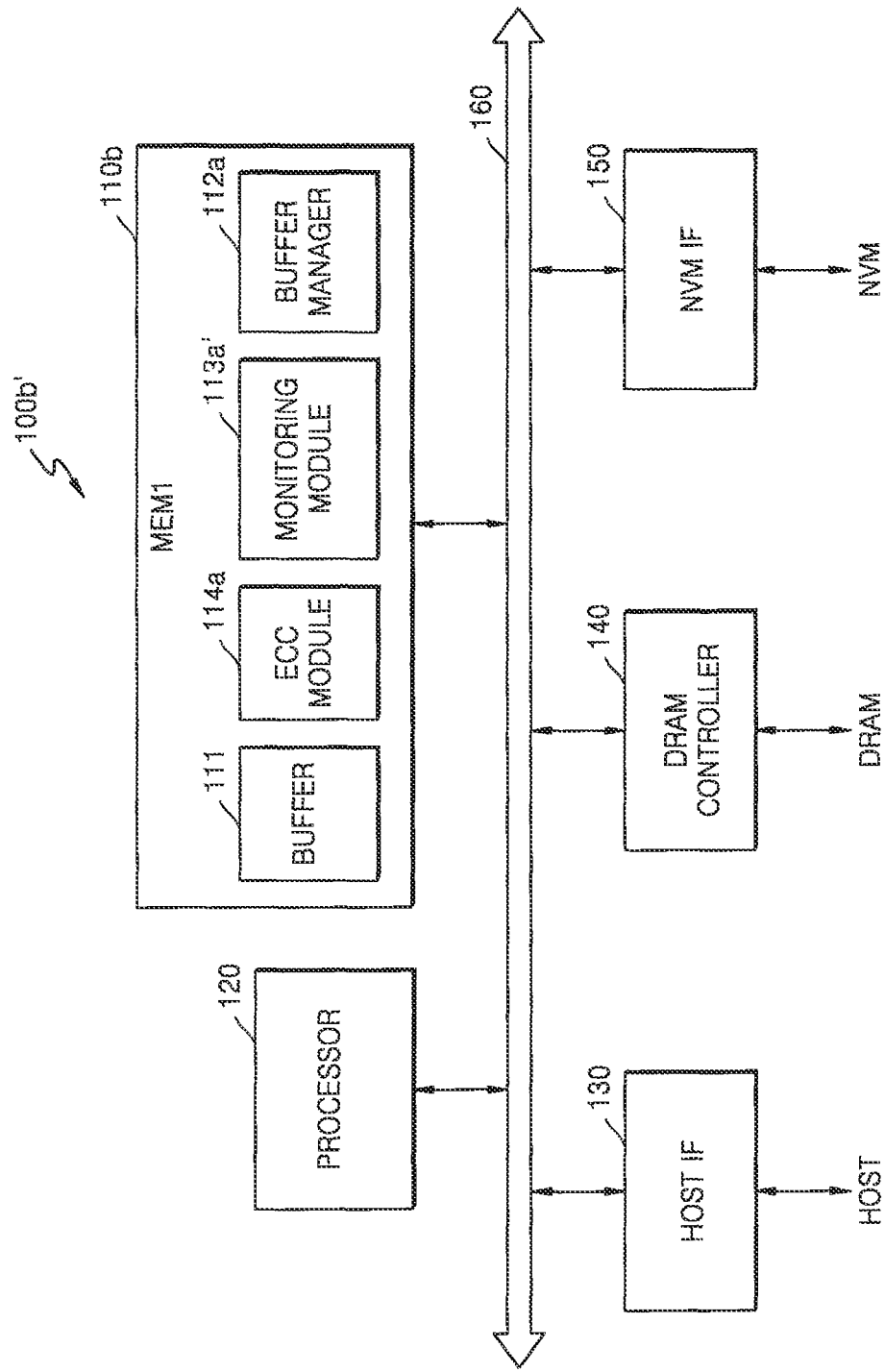
FIG. 8 is a block diagram illustrating in detail an example of a controller of FIG. 7, according to an embodiment of the invention.

FIG. 8 is a block diagram illustrating in detail a controller 100b', which may be utilized as the controller 100b of FIG. 7, according to an embodiment of the invention. Referring to FIG. 8, the controller 100b' may include a first memory 110b, the processor 120, the host interface 130, the DRAM controller 140, and the NVM interface 150, which may communicate with each other through the bus 160. For example, the second memory 300 of FIG. 7 may be DRAM, and accordingly, the controller 100b' may include the DRAM controller 140 for controlling DRAM. The controller 100b' according to the current embodiment may correspond to a modified example of the controller 100a' of FIG. 5, and thus redundant details are not provided again herein.

The buffer manager 112a, a monitoring module 113a', and an ECC module 114a may be loaded onto the first memory 110b. The buffer manager 112a, the monitoring module 113a', and the ECC module 114a may be embodied as firmware and/or software, and may be loaded onto the first memory 110b. The buffer manager 112a may correspond to an example of the buffer manager 112 of FIG. 7, the monitoring module 113a' may correspond to an example of the monitoring module 113' of FIG. 7, and the ECC module 114a may correspond to an example of the ECC module 114 of FIG. 7. The first memory 110b may include the buffer 111, and the buffer 111 may be used as a write buffer or a read buffer. However, an embodiment is not limited thereto, and at least one of the buffer manager 112, the monitoring module 113a', and the ECC module 114 of FIG. 7 may be embodied as hardware, and accordingly, provided outside the first memory 110b.

Figure 9:
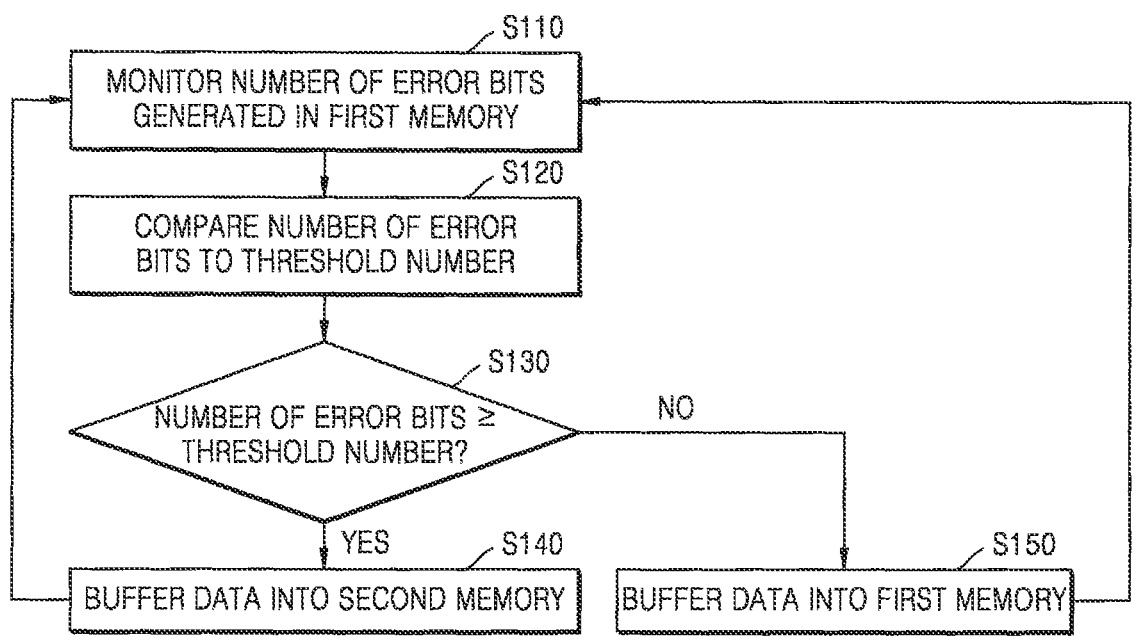
FIG. 9 is a flowchart of operations that illustrates a method of operating a storage device, according to an embodiment of the invention.

FIG. 9 is a flowchart of a method of operating a storage device, according to an embodiment of the invention. Referring to FIG. 9, the method according to the current embodiment may be a method of dynamically determining a buffer memory. This method may include operations performed by the storage device 10 of FIG. 1, the storage device 10a of FIG. 4, or the storage device 10b of FIG. 7 in time series. Hereinafter, the method according to the current embodiment will be described with reference to FIGS. 1 through 9.

In operation S110, the number of error bits generated in a first memory is monitored. For example, the controller 100 may periodically or intermittently monitor the number of error bits generated in the first memory 110. For example, when a read request is received from the host 20, the controller 100 may monitor the number of error bits generated in the first memory 110. And, according to some embodiments of the invention, a generation frequency of the error bits generated in the first memory may be monitored.

In operation S120, the number of error bits is compared to a threshold number. For example, the controller 100 may determine whether the number of error bits recorded in an error status register is equal to or higher than the threshold number. According to some embodiments of the invention, the threshold number may be pre-determined. But, according to other embodiments of the invention, the threshold number may be dynamically changed during operations of the storage device. Also, according to some embodiments of the invention, the generation frequency of the error bits may be compared to a threshold value. In operation S130, it is determined whether the number of error bits is equal to or higher than the threshold number. When it is determined that the number of error bits is equal to or higher than the threshold number, operation S140 is performed. When it is determined that the number of error bits is lower than the threshold number, operation S150 is performed.

In operation S140, data is buffered into a second memory. For example, the controller 100 may determine the second memory 300 as a buffer memory, and use the second memory 300 as a write buffer or a read buffer. Accordingly, reliability of the storage device 10 may be prevented from deteriorating due to generation of bit-flip in the first memory 110. In operation S150, data is buffered into a first memory. For example, the controller 100 may determine the first memory 110 as the buffer memory, and use the first memory 110 as the write buffer or the read buffer. Accordingly, performance of the storage device 10 may be increased by using a high speed of the first memory 110.

Also, according to some embodiments, the method according to the current embodiment may further include monitoring an I/O speed of write data or read data, and dynamically determining the first or second memory as the buffer memory for buffering the write data or the read data based on the I/O speed. In detail, the controller 100 may monitor a data I/O speed based on data input to and data output from the first memory 110. The controller 100 may determine the second memory 300 as the buffer memory when the monitored data I/O speed is equal to or higher than a threshold speed. Also, the controller 100 may determine the first memory 110 as the buffer memory when the monitored data I/O speed is lower than the threshold speed.

Figure 10:
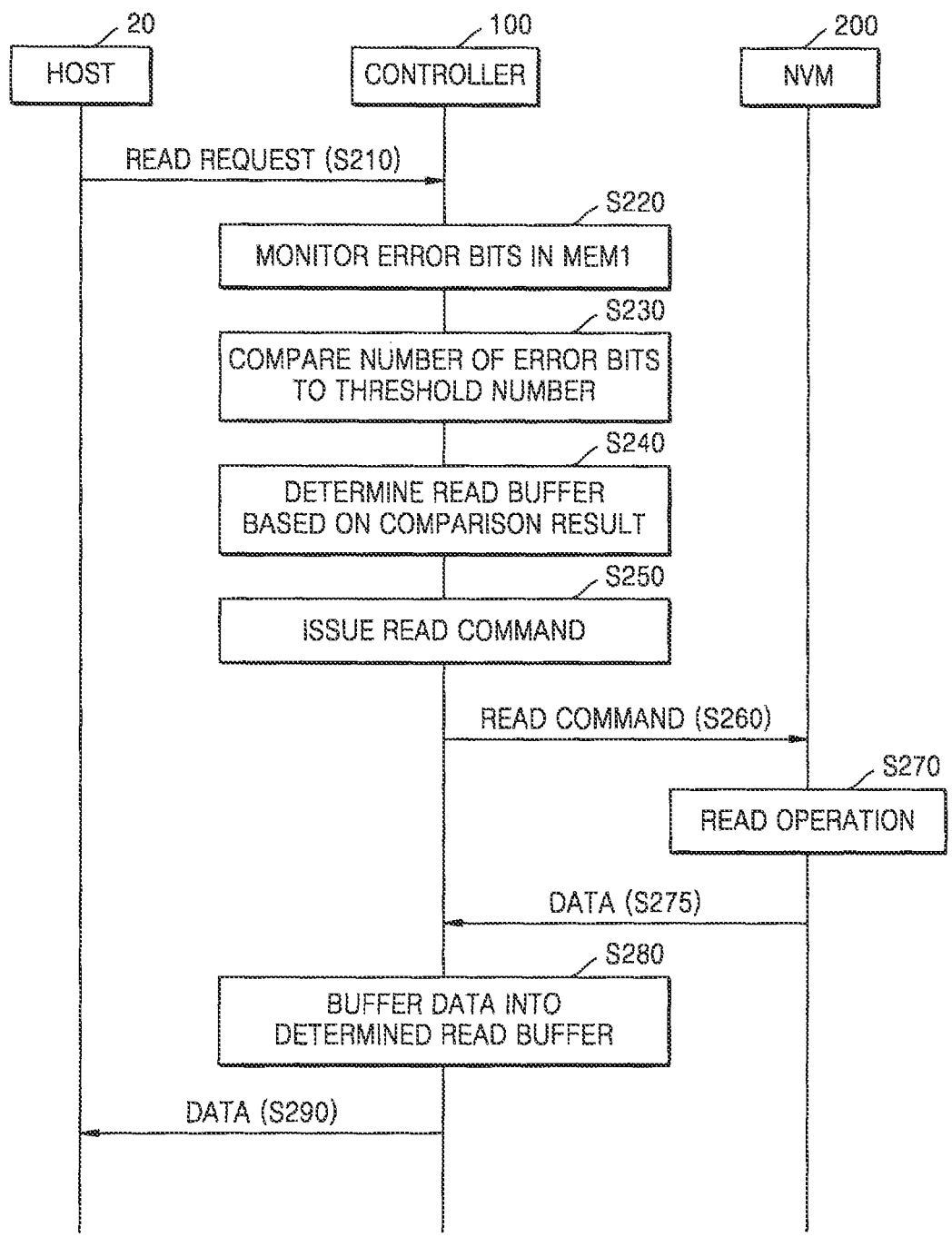
FIG. 10 is a flow diagram of operations between a host, a controller, and a nonvolatile memory, according to an embodiment of the method of FIG. 9.

FIG. 10 is a flow diagram of operations between the host 20, the controller 100, and the NVM 200, according to the method of FIG. 9. The host 20, the controller 100, and the NVM 200 of FIG. 10 may respectively correspond to the host 20, the controller 100, and the NVM 200 of FIG. 1. Referring to FIG. 10, in operation S210, the host 20 may transmit a read request to the controller 100. According to an embodiment, the host 20 may transmit a logic address together with the read request to the controller 100. The host 20 may transmit a key together with the read request to the controller 100, and in this case, the controller 100 and the NVM 200 may configure a key-value storage device.

In operation S220, the controller 100 may monitor error bits generated in the first memory 110. The controller 100 may monitor the number of error bits by comparing data input to the first memory 110 to data output from the first memory 110. The controller 100 may monitor the number of error bits based on a result of performing an ECC operation with respect to the first memory 110.

In operation S230, the controller 100 may compare the number of error bits to a threshold number. In operation S240, the controller 100 may determine a read buffer based on a comparison result. For example, the controller 100 may determine the second memory 300 as the read buffer when the number of error bits is equal to or higher than the threshold number, yet determine the first memory 110 as the read buffer when the number of error bits is lower than the threshold number.

In operation S250, the controller 100 may issue a read command. According to an embodiment of the invention, the controller 100 may change the logic address received from the host 20 to a physical address by referring to a mapping table (for example, a logical-to-physical (L2P) address mapping table). According to an embodiment, the controller 100 may change the key received from the host 20 to a physical address by referring to a mapping table, such as a key-to-physical (K2P) address mapping table.

In operation S260, the controller 100 may transmit the read command to the NVM 200. Here, the controller 100 may transmit the read command together with the physical address. In operation S270, the NVM 200 may perform a read operation. In detail, the NVM 200 may read data stored in the physical address. In operation S275, the NVM 200 may transmit the data to the controller 100.

In operation S280, the controller 100 may buffer the data into the designated read buffer. For example, when the first memory 110 is determined as the read buffer in operation S240, the controller 100 may buffer the data into the first memory 110. But, when the second memory 300 is designated as the read buffer in operation S240, the controller 100 may buffer the data into the second memory 300. In operation S290, the controller 100 may transmit the data to the host 20.

Figure 11:
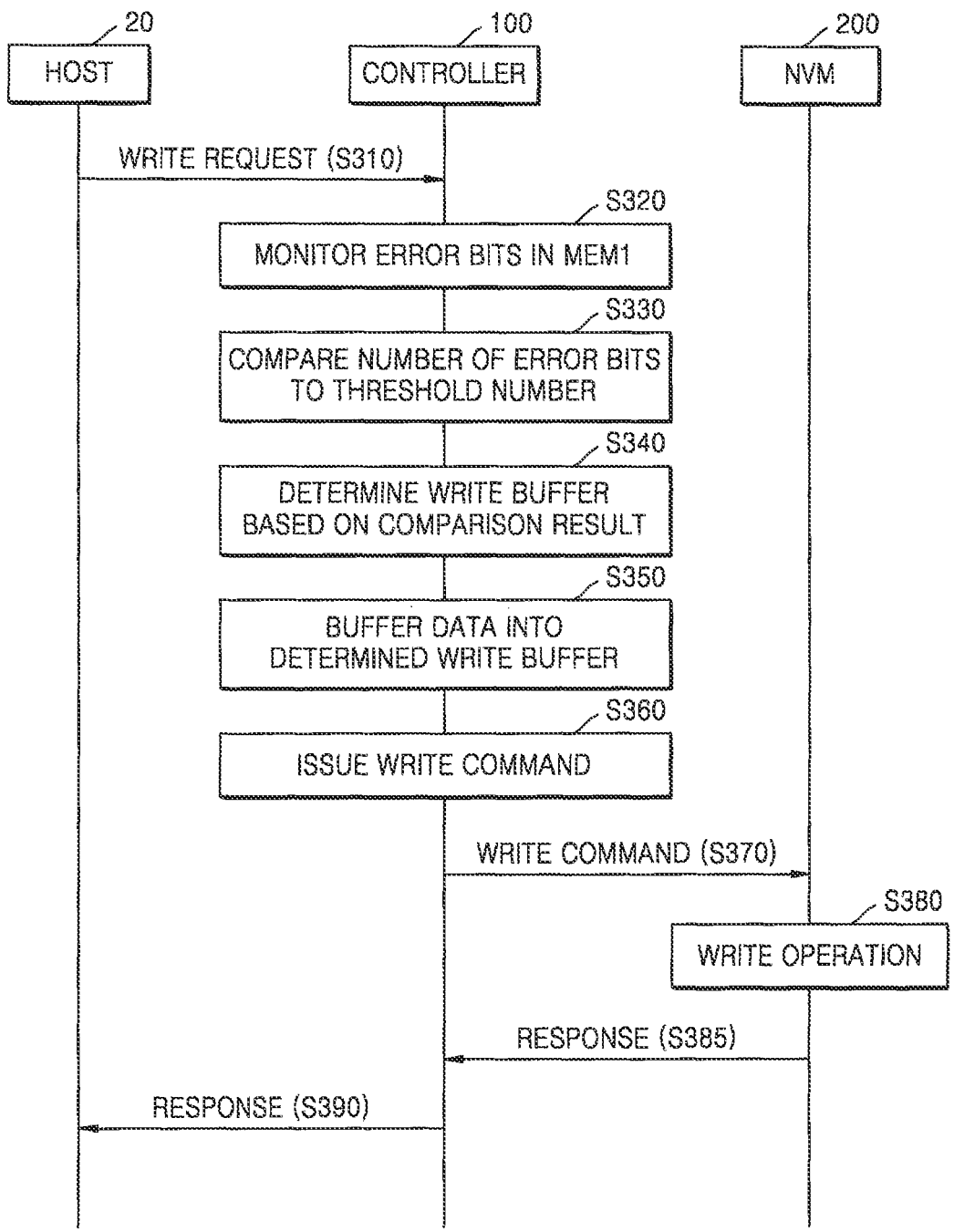
FIG. 11 is a flow diagram of operations between a host, a controller, and a nonvolatile memory, according to another embodiment of the method of FIG. 9.

FIG. 11 is a flow diagram of operations between the host 20, the controller 100, and the NVM 200, according to another embodiment of the method of FIG. 9. The host 20, the controller 100, and the NVM 200 of FIG. 10 may respectively correspond to the host 20, the controller 100, and the NVM 200 of FIG. 1. Referring to FIG. 11, in operation S310, the host 20 may transmit a write request to the controller 100. According to an embodiment, the host 20 may transmit data together with the write request to the controller 100. According to an embodiment, the host 20 may transmit a key-value pair together with the write request to the controller 100, so that the controller 100 and the NVM 200 may operate as a key-value storage device.

In operation S320, the controller 100 may monitor error bits generated in the first memory 110. In particular, the controller 100 may monitor the number of error bits by comparing data input to the first memory 110 to data output from the first memory 110. And, the controller 100 may even monitor the number of error bits based on a result of performing an ECC operation with respect to the first memory 110.

In operation S330, the controller 100 may compare the number of error bits to a threshold number. In operation S340, the controller 100 may determine a write buffer based on a comparison result. For example, the controller 100 may determine the second memory 300 as the write buffer when the number of error bits is equal to or higher than the threshold number. But, alternatively, the controller 100 may determine the first memory 110 as the write buffer when the number of error bits is lower than the threshold number. However, an embodiment is not limited thereto, and operations S320 through S340 may be performed before operation S310. Accordingly, the controller 100 may pre-determine the write buffer by monitoring the error bits generated in the first memory 110, and buffer data into the pre-determined write buffer when the write request is received.

In operation S350, the controller 100 may buffer the data into the determined write buffer. For example, when the first memory 110 is determined as the write buffer in operation S340, the controller 100 may buffer the data into the first memory 110. For example, when the second memory 300 is determined as the write buffer in operation S340, the controller 100 may buffer the data into the second memory 300.

In operation S360, the controller 100 may issue a write command. Here, the controller 100 may generate a physical address for storing the data in the NVM 200. In operation S370, the controller 100 may transmit the write command to the NVM 200. At this time, the controller 100 may transmit the data together with the write command. In operation S380, the NVM 200 may perform a write operation. In detail, the NVM 200 may write the data on the physical address. In operation S385, the NVM 200 may transmit a response message indicating that the write operation is completed, to the controller 100. In operation S390, the controller 100 may transmit the response message indicating that the write operation is completed, to the host 20.

Figure 12:
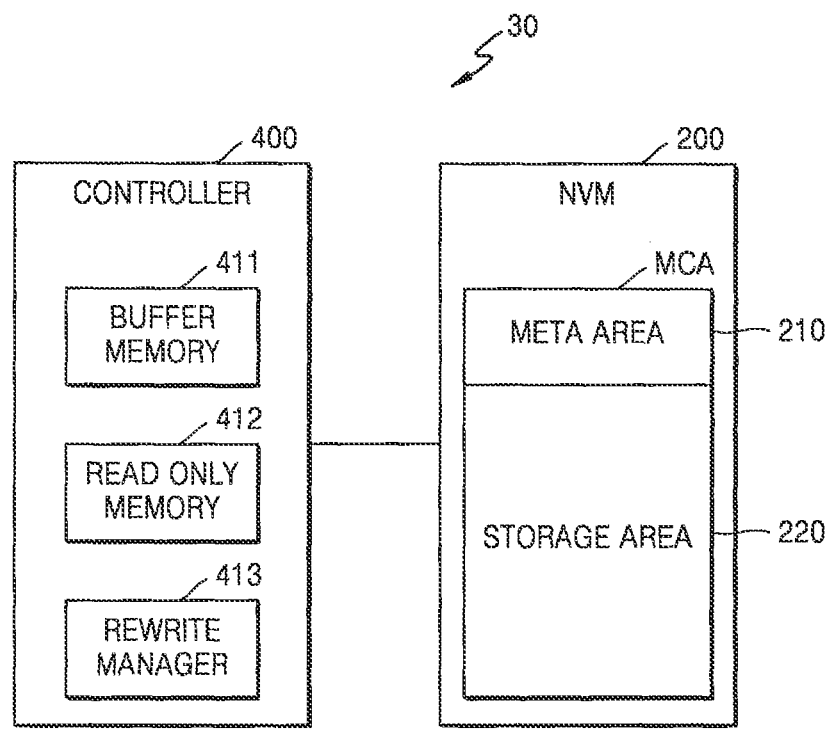
FIG. 12 is a block diagram of a storage device according to another embodiment of the invention.

FIG. 12 is a block diagram of a storage device 30 according to another embodiment of the invention. Referring to FIG. 12, the storage device 30 may include a controller 400 and the NVM 200. Also, the storage device 30 may further include the second memory 300 as in FIG. 1 (e.g., DRAM). The controller 400 may include a buffer memory 411, a read-only memory 412, and a rewrite manager 413. According to an embodiment of the invention, the buffer memory 411 and the read-only memory 412 may be implemented in a single memory chip. For example, the buffer memory 411 and the read-only memory 412 may be embodied as an SRAM, but the buffer memory 411 and the read-only memory 412 may also be implemented using a plurality of memory chips.

The buffer memory 411 may buffer write data to be written on the NVM 200 or read data read from the NVM 200. Also, the buffer memory 411 may store a mapping table for converting a logic address or key received from a host to a physical address of the NVM 200. The read-only memory 412 may store metadata for performing a control operation of the controller 400. For example, the read-only memory 412 may store metadata, such as firmware code, an ECC encoder, an ECC decoder, or an asynchronous response mode (ARM) code.

For example, the buffer memory 411 and the read-only memory 412 may be embodied as SRAM. As described above, the SER of SRAM may increase when a data I/O speed is increased or the altitude of a usage environment is increased. In this case, bit flip of data stored in SRAM may be generated, and since the read-only memory 412 stores metadata important in operations of the storage device 30, a rewrite operation or a refresh operation may be periodically performed on the read-only memory 412 so that the metadata is not damaged.

The rewrite manager 413 may compare the number or generation frequency of error bits generated in the buffer memory 411 to a threshold value, and determine a rewrite cycle of the read-only memory 412 based on a comparison result. According to an embodiment, the rewrite manager 413 may be embodied as software and/or firmware, and loaded to the first memory 110 of FIG. 1. However, an embodiment is not limited thereto, and according to some embodiments, the rewrite manager 413 may be embodied exclusively as hardware.

According to another embodiment, the rewrite manager 413 may decrease the rewrite cycle when the number of error bits generated in the buffer memory 411 is equal to or higher than a threshold number, and accordingly, increase the number of times the rewrite operation is performed with respect to the read-only memory 412. Then, when the number of error bits generated in the buffer memory 411 is decreased to be lower than the threshold number, the rewrite manager 413 may increase the rewrite cycle again, and accordingly, the number of times the rewrite operation is performed with respect to the read-only memory 412 may be decreased again.

According to an embodiment of the invention, when the number of error bits generated in the buffer memory 411 is lower than the threshold number, the rewrite manager 513 may maintain the rewrite cycle. However, an embodiment is not limited thereto, and the rewrite manager 413 may increase the rewrite cycle when the number of error bits generated in the buffer memory 411 is lower than the threshold number, and accordingly, the number of times the rewrite operation is performed with respect to the read-only memory 412 may be decreased. Then, when the number of error bits generated in the buffer memory 411 is increased to be equal to or higher than the threshold number, the rewrite manager 413 may decrease the rewrite cycle, and accordingly, the number of times the rewrite operation is performed with respect to the read-only memory 412 may be increased.

Figure 13:
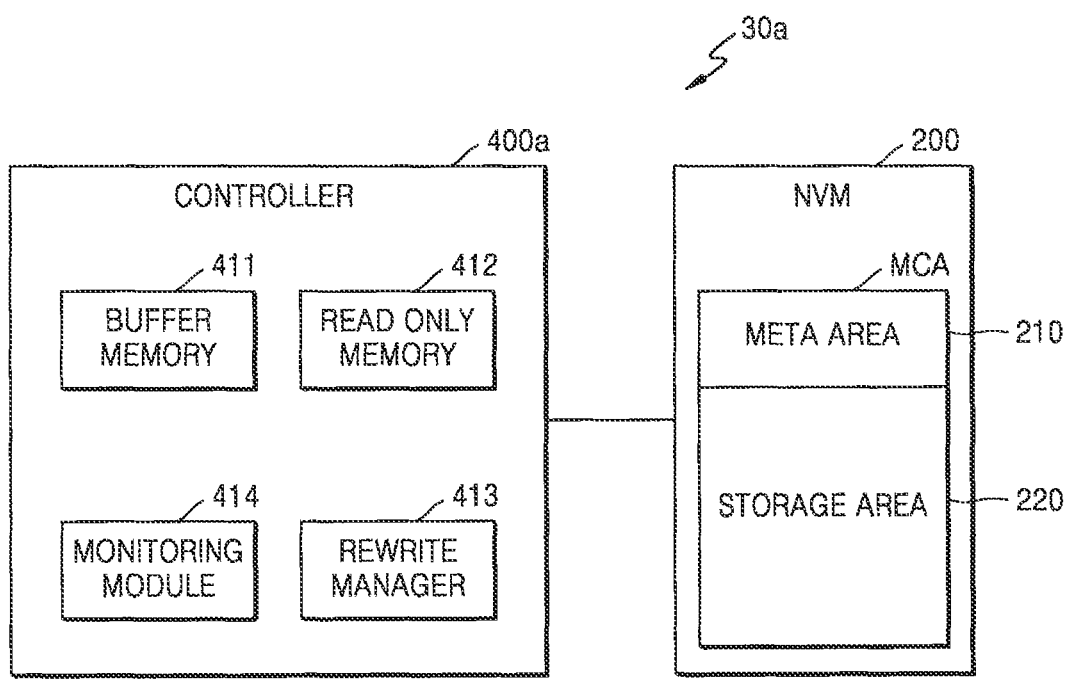
FIG. 13 is a block diagram of a storage device according to another embodiment of the invention.

FIG. 13 is a block diagram of a storage device 30a according to another embodiment of the invention. Referring to FIG. 13, the storage device 30a may include a controller 400a and the NVM 200. The controller 400a may include the buffer memory 411, the read-only memory 412, the rewrite manager 413, and a monitoring module 414. The storage device 30a according to the current embodiment may correspond to an example of the storage device 30 of FIG. 12.

According to an embodiment, the monitoring module 414 may monitor error bits generated in the buffer memory 411. For example, the monitoring module 414 may monitor the number of error bits by comparing data input to the buffer memory 411 to data output from the buffer memory 411. For example, the monitoring module 414 may be embodied to include an error status register recording the monitored number of error bits.

In this case, the rewrite manager 413 may receive the number of error bits from the monitoring module 414, compare the received number of error bits to a threshold number, and determine a rewrite cycle with respect to the read-only memory 412 based on a comparison result. According to an embodiment, the rewrite manager 413 may change the rewrite cycle with respect to the read-only memory 412 when a value recorded in the error status register reaches the threshold number.

According to an embodiment, the monitoring module 414 may monitor a data I/O speed based on data input to the buffer memory 411 and data output from the buffer memory 411. For example, the monitoring module 414 may be embodied to include an I/O speed register recording the monitored data I/O speed. According to an embodiment of the invention, the monitoring module 414 may monitor a maximum data usage rate. For example, the monitoring module 414 may be embodied to include a maximum data usage rate register recording the monitored maximum data usage rate.

In this case, the rewrite manager 413 may receive the data I/O speed from the monitoring module 414, compare the received data I/O speed to a threshold speed, and determine the rewrite cycle with respect to the read-only memory 412 based on a comparison result. According to an embodiment, the rewrite manager 413 may change the rewrite cycle with respect to the read-only memory 412 when a value recorded in the I/O speed register or maximum data usage rate register reaches the threshold speed.

Figure 14:
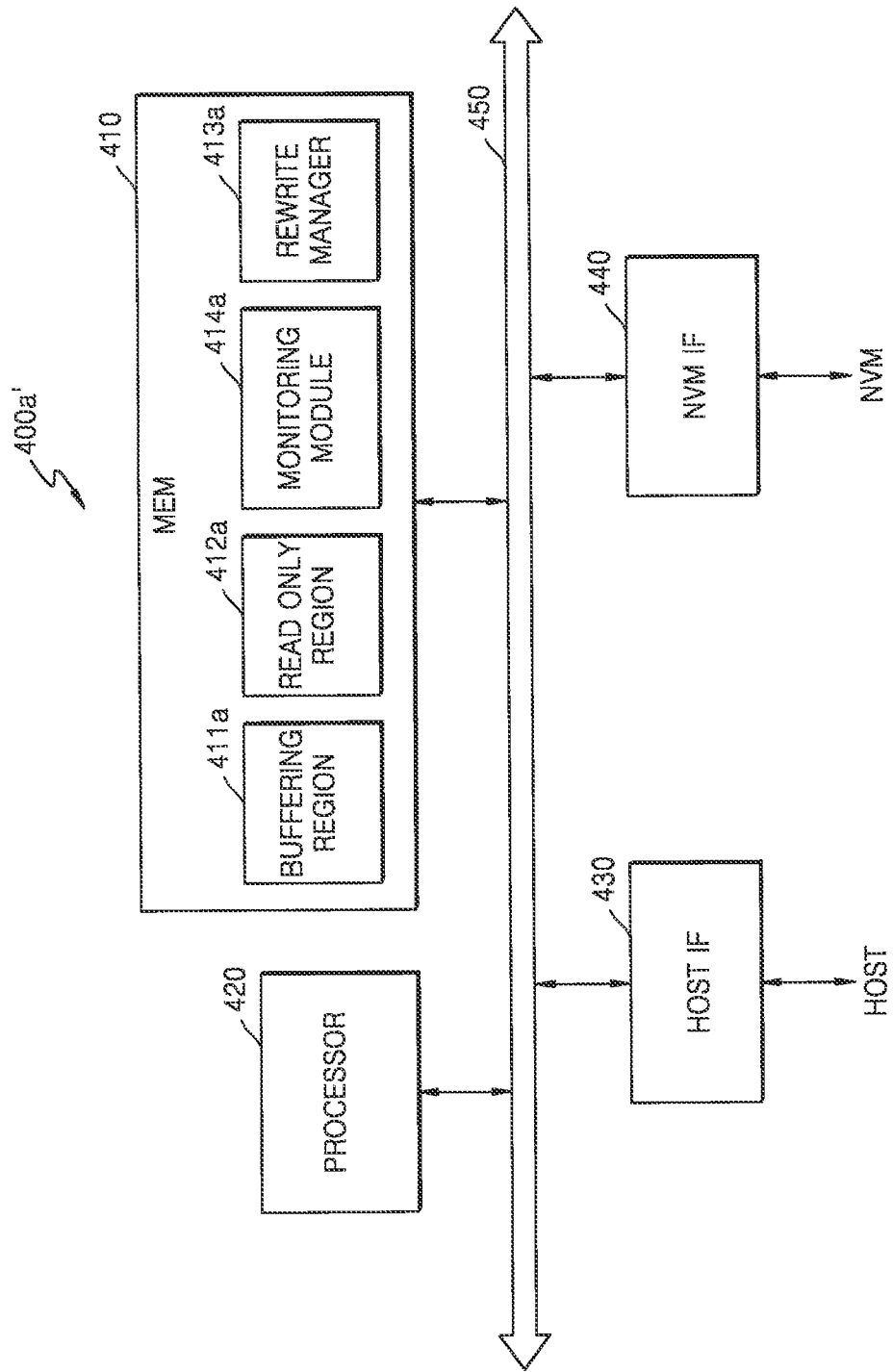
FIG. 14 is a block diagram illustrating in detail an example of a controller of FIG. 13, according to an embodiment of the invention.

FIG. 14 is a block diagram illustrating, in detail, a controller 400a' according to an embodiment of the invention, which may be an example of the controller 400a of FIG. 13. Referring to FIG. 14, the controller 400a' may include a memory 410, a processor 420, a host interface 430, and an NVM interface 440, and the components of the controller 400a' may communicate with each other through a bus 450. According to some embodiments, the storage device 30a of FIG. 13 may further include DRAM, and in this case, the controller 400a' may further include a DRAM controller for controlling DRAM.

The processor 420 may include a CPU or a microprocessor, and control overall operations of the controller 400a'. The processor 420 may be embodied similar to the processor 120 of FIG. 5. The memory 410 operates according to control of the processor 420, and may be used as an operation memory, a buffer memory, or a cache memory. For example, the memory 410 may be embodied as a volatile memory, such as DRAM or SRAM, or a NVM, such as PRAM or a flash memory.

A rewrite manager 413a and a monitoring module 414a may be loaded onto the memory 410. The rewrite manager 413a and the monitoring module 414a may be embodied as firmware or software, and loaded onto the memory 410. The rewrite manager 413a may correspond to an example of the rewrite manager 413 of FIG. 13, and the monitoring module 414a may correspond to an example of the monitoring module 414 of FIG. 13. The memory 410 may include a buffering region 411a and a read-only region 412a, and the buffering region 411a may be used as a write buffer or a read buffer. The buffering region 411a may correspond to an example of the buffer memory 411 of FIG. 13, and the read-only region 412a may correspond to an example of the read-only memory 412 of FIG. 13.

The host interface 430 may provide an interface between a host (for example, the host 20 of FIG. 1) and the controller 400a', and may be embodied similar to the host interface 130 of FIG. 5. The NVM interface 440 may provide an interface between the controller 400a' and the NVM 200, and may be embodied similar to the NVM interface 150 of FIG. 5.

Figure 15:
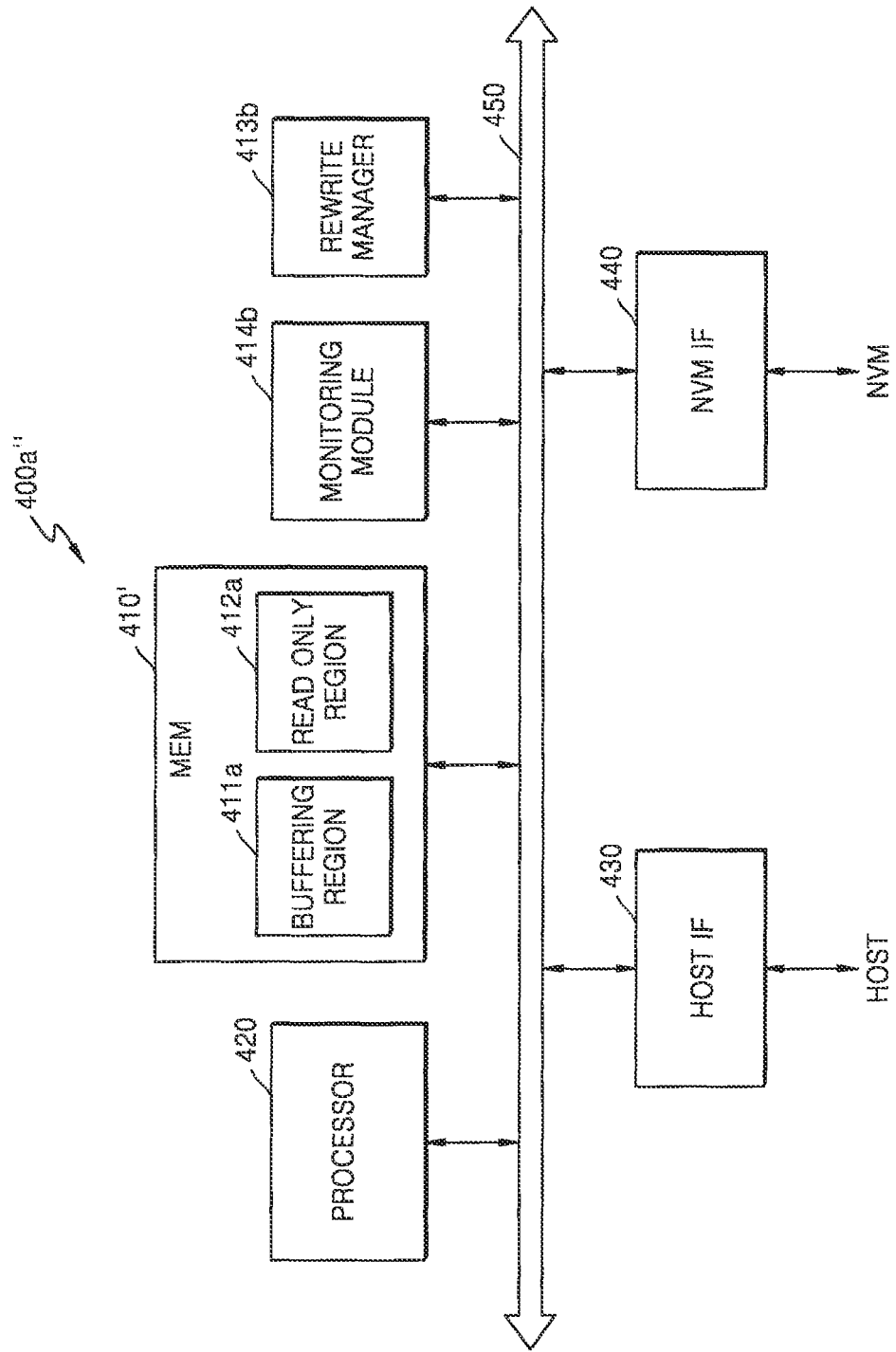
FIG. 15 is a block diagram illustrating in detail an example of the controller of FIG. 13, according to another embodiment of the invention.

FIG. 15 is a block diagram illustrating in detail a controller 400a", which is an example of the controller 400a of FIG. 13, according to another embodiment of the invention. Referring to FIG. 15, the controller 400a" may include a memory 410', the processor 420, a rewrite manager 413b, a monitoring module 414b, the host interface 430, and the NVM interface 440, and the components of the controller 400a" may communicate with each other through the bus 450. The controller 400a" according to the current embodiment may correspond to a modified example of the controller 400a' of FIG. 14, and thus redundant details are not provided again herein.

The memory 410' may include the buffering region 411a and the read-only region 412a, and the buffering region 411a may be used as a write buffer or a read buffer. The rewrite manager 413b and the monitoring module 414b may be embodied as hardware, and accordingly provided outside the memory 410'. The rewrite manager 413b may correspond to an example of the rewrite manager 413 of FIG. 13, and the monitoring module 414b may correspond to an example of the monitoring module 414 of FIG. 13.

Figure 16:
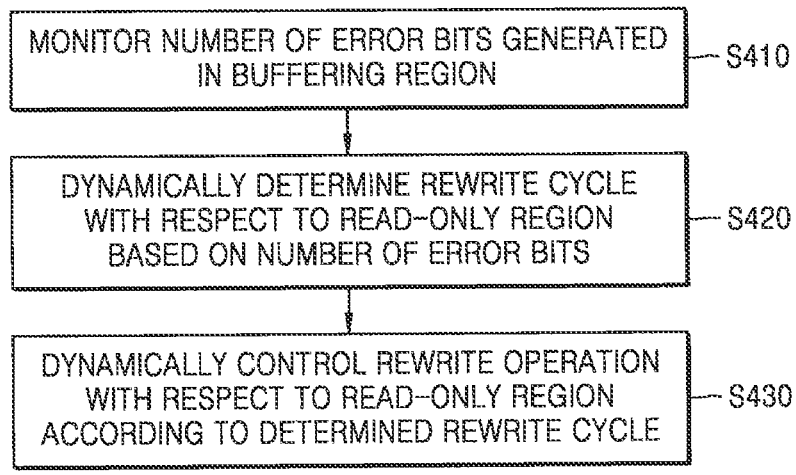
FIG. 16 is a flowchart of operations that illustrates a method of operating a storage device, according to another embodiment of the invention.

FIG. 16 is a flowchart of a method of operating a storage device, according to another embodiment. Referring to FIG. 16, the method according to the current embodiment may be a method of dynamically controlling a rewrite operation of a read-only memory in a controller and, for example, may include operations performed by the storage device 30 of FIG. 12 or the storage device 30a of FIG. 13 in time series. Hereinafter, the method according to the current embodiment will be described with reference to FIGS. 12 through 16.

In operation S410, the number of error bits generated in a buffering region is monitored. For example, the controller 400 may periodically or intermittently monitor the number of error bits generated in the buffer memory 411. For example, when a read request or write request is received from a host, the controller 400 may monitor the number of error bits generated in the buffer memory 411. Also, according to some embodiments, a generation frequency of the error bits generated in the buffering region may be monitored.

In operation S420, a rewrite cycle with respect to a read-only region is dynamically determined based on the number of error bits. For example, the controller 400 may dynamically determine the rewrite cycle with respect to the read-only memory 412 based on the number of error bits recorded in the error status register. According to an embodiment, the controller 400 may compare the number of error bits to a threshold number, and decrease the rewrite cycle when the number of error bits is equal to or higher than the threshold number and increase the rewrite cycle when the number of error bits is lower than the threshold number. Also, according to some embodiments, the rewrite cycle with respect to the read-only region may be dynamically determined based on the generation frequency of error bits. In addition, according to some embodiments, the method may further include monitoring an I/O speed of write data or read data, and dynamically determining the rewrite cycle based on the I/O speed.

In operation S430, a rewrite operation with respect to the read-only region is dynamically controlled according to the determined rewrite cycle. In detail, the controller 400 may read metadata stored in the meta area 210 of the NVM 200, and rewrite the read metadata on the read-only memory 412. Accordingly, generation of bit flip in the read-only memory 412 is prevented, and as a result, reliability of the storage device 30 may be increased.

Figure 17:
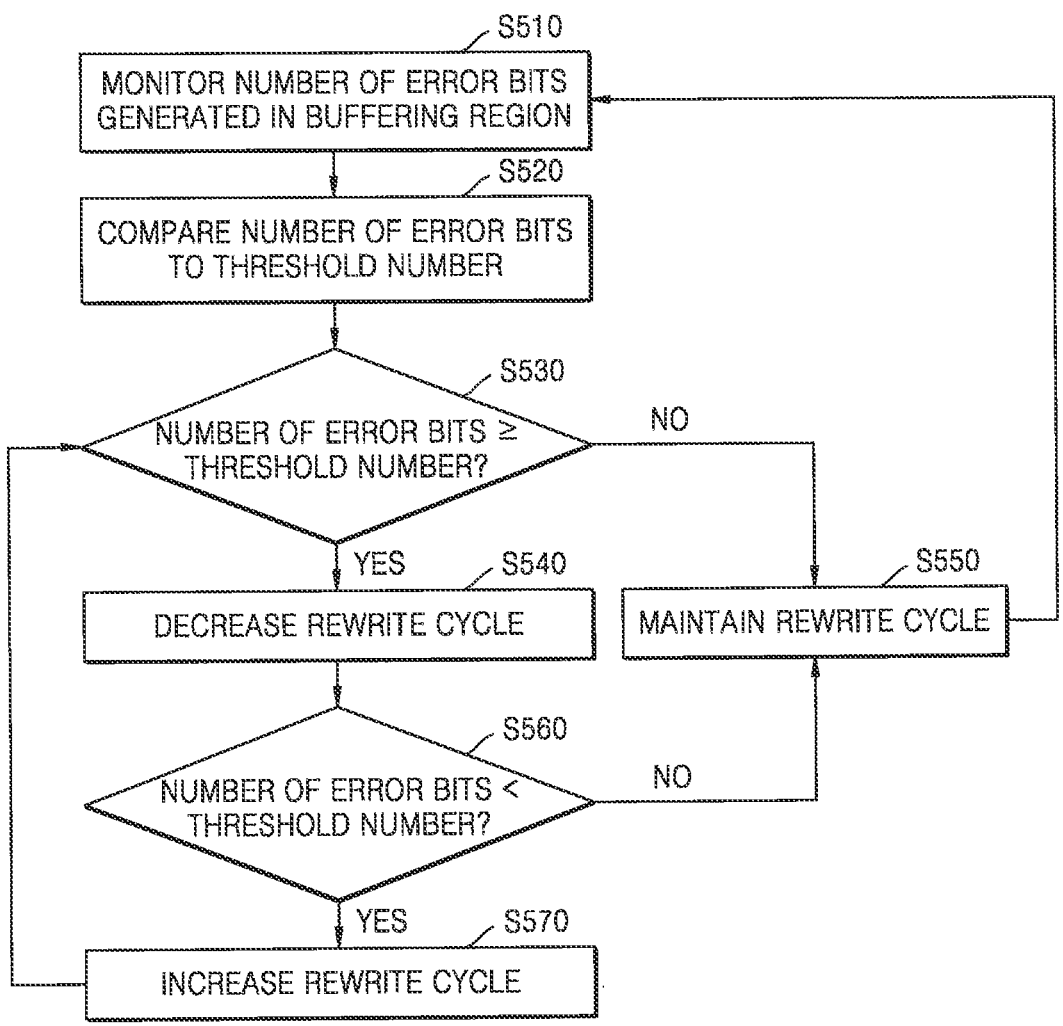
FIG. 17 is a flowchart of operations that illustrate a method of operating a storage device, according to another embodiment of the invention.

FIG. 17 is a flowchart of a method of operating a storage device, according to another embodiment. Referring to FIG. 17, the method according to the current embodiment may correspond to an example of the method of FIG. 16. In operation S510, the number of error bits generated in a buffering region is monitored. In operation S520, the number of error bits is compared to a threshold number. In operation S530, it is determined whether the number of error bits is equal to or higher than a threshold number. When it is determined that the number of error bits is equal to or higher than the threshold number, operation S540 is performed. In operation S540, a rewrite cycle is decreased. Alternatively, when it is determined that the number of error bits is lower than the threshold number, operation S550 is performed. In operation S550, the rewrite cycle is maintained.

In operation S560, it is determined whether the number of error bits is lower than the threshold number. When it is determined that the number of error bits is lower than the threshold number, operation S570 is performed. Otherwise, when it is determined that the number of error bits is equal to or higher than the threshold number, operation S550 is performed. In operation S570, the rewrite cycle is increased. As such, according to the current embodiment, even after the rewrite cycle is determined based on a result of comparing the number of error bits to the threshold number, the number of error bits may be continuously compared to the threshold number and change the rewrite cycle based on a comparison result.

Figure 18:
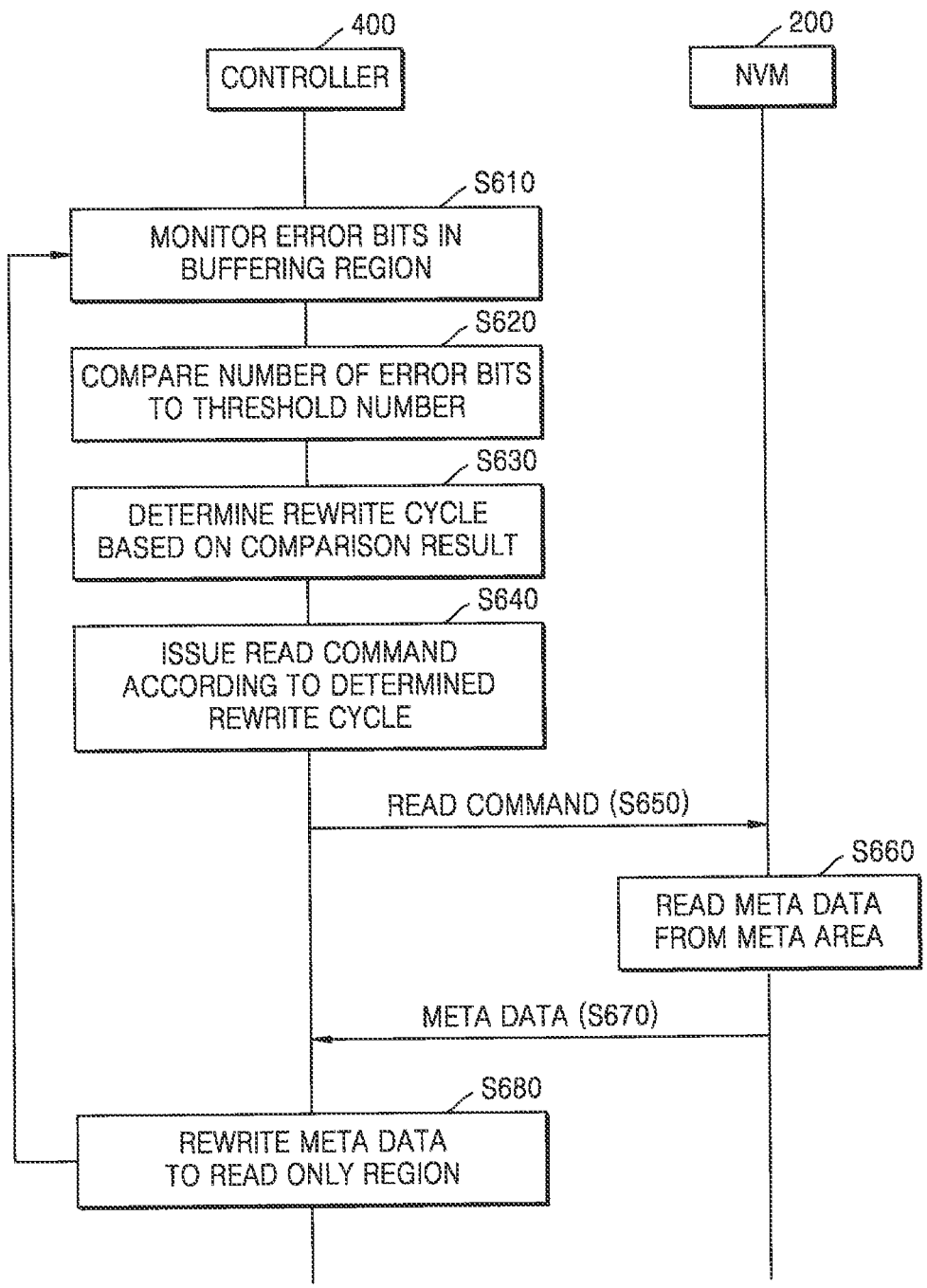
FIG. 18 is a flow diagram of operations between a controller and a nonvolatile memory, according to an embodiment of the method of FIG. 16.

FIG. 18 is a flow diagram of operations between the controller 400 and the NVM 200, according to an embodiment of the method of FIG. 16. The controller 400 and the NVM 200 may respectively correspond to the controller 400 and the NVM 200 of FIG. 12. In operation S610, the controller 400 monitors error bits generated in a buffering region. And, in operation S620, the controller 400 compares the number of error bits to a threshold number. Then, in operation S630, the controller 400 determines a rewrite cycle based on a comparison result. In operation S640, the controller 400 issues a read command according to the determined rewrite cycle.

In operation S650, the controller 400 transmits the read command to the NVM 200. In operation S660, the NVM 200 reads metadata from the meta area 210. In operation S670, the NVM 200 transmits the metadata to the controller 400. In operation S680, the controller 400 rewrites the metadata on a read-only memory.

According to an embodiment, the controller 400 may perform a read operation on the NVM 200 whenever a rewrite operation is performed, and directly rewrite the metadata read from the NVM 200 on the read-only memory or the read-only region. In this case, operations S640 through S670 may be repeated according to the rewrite cycle.

According to an embodiment, when power is supplied to a storage device, the controller 400 may perform a read operation on the NVM 200, and load the metadata read from the NVM 200 onto DRAM. Then, the controller 400 may rewrite the metadata loaded onto the DRAM in the read-only memory or the read-only region whenever the rewrite operation is performed. In this case, operations S640 through S670 may not be repeated even when the rewrite operation is repeated.

Figure 19:
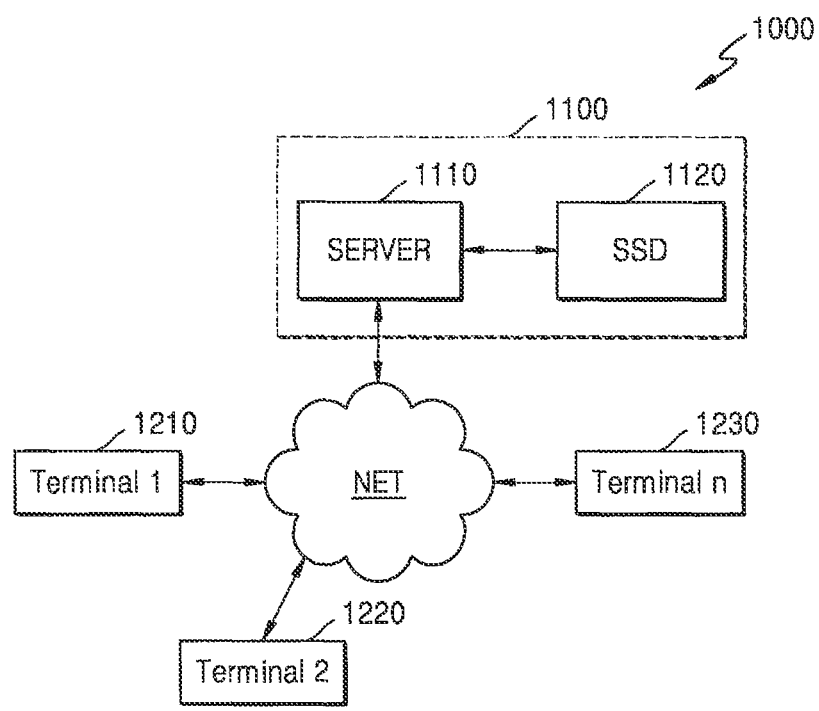
FIG. 19 is a diagram of a network system according to an embodiment of the invention.

FIG. 19 is a diagram of a network system 1000 according to an embodiment. Referring to FIG. 19, the network system 1000 may include a server system 1100 and a plurality of terminals, for example, first through third terminals 1210 through 1230, communicating with the server system 1100 through a network NET. The server system 1100 may include a server 1110 and an SSD 1120. The server 1110 may correspond to a host described above, and the SSD 1120 may correspond to a storage device described above.

According to an embodiment, the SSD 1120 may be implemented by using the embodiments described above with reference to FIGS. 1 through 18. For example, the SSD 1120 may include an NVM and a controller, and the controller may include a memory, such as SRAM. The SSD 1120 may periodically or intermittently monitor error bits generated in the memory included in the controller, and dynamically determine a buffer memory or a rewrite cycle with respect to a read-only memory based on a monitoring result.

Figure 20:
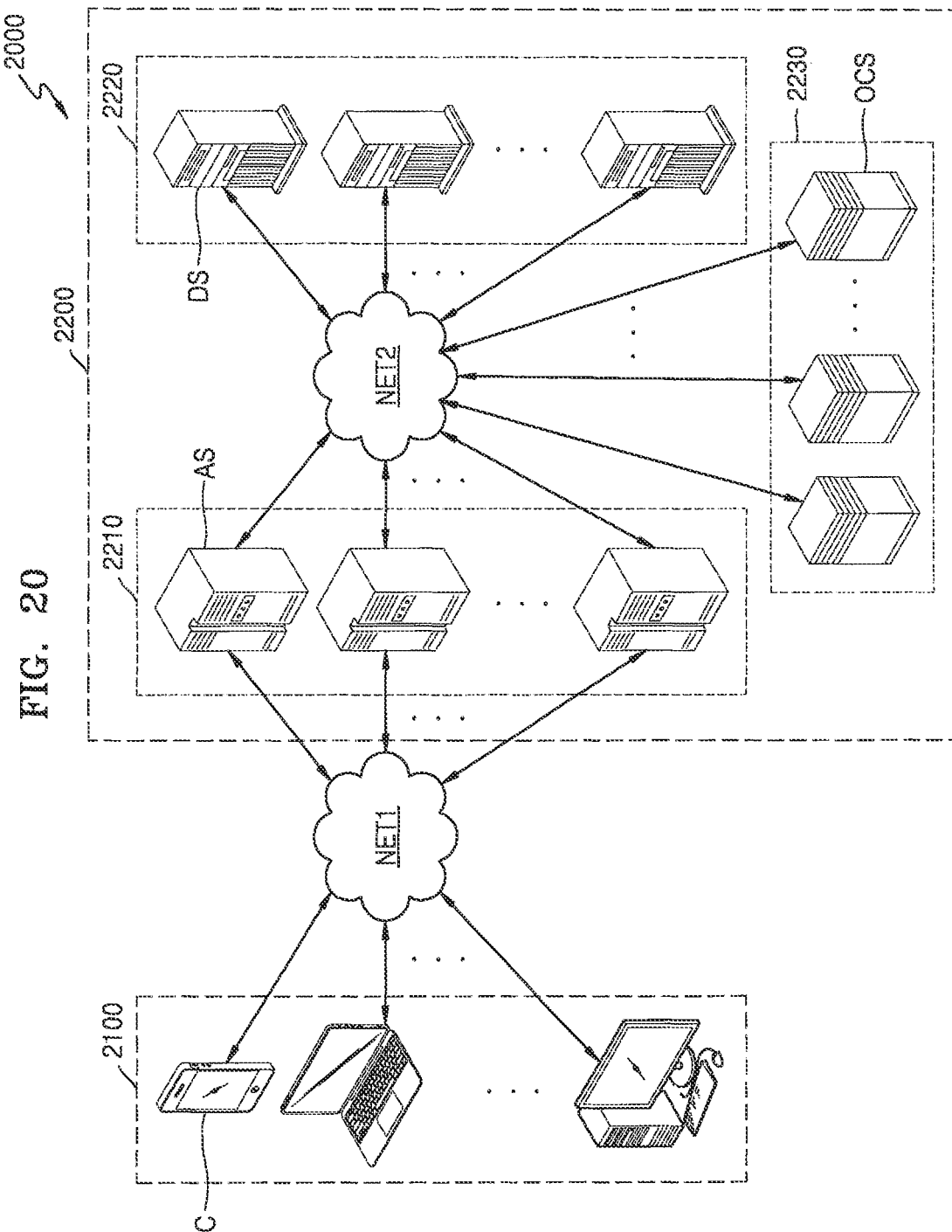
FIG. 20 is a diagram of a network system according to another embodiment of the invention.

FIG. 20 is a diagram of a network system 2000 according to another embodiment. Referring to FIG. 20, the network system 2000 may include a client group 2100 and a data center 2200. The client group 2100 may include client devices C communicating with the data center 2200 through a first network NET1, for example, the Internet. The data center 2200 is a facility that stores various types of data and provides a service, and may include an application server group 2210, a database server group 2220, and an object cache server group 2230, which communicate with each other through a second network, for example, a local area network (LAN) or the Intranet.

The application server group 2210 may include application server devices AS, wherein the application server devices AS process a request received from the client group 2100, and access the database server group 2220 or the object cache server group 2230 based on the request of the client group 2100. The database server group 2220 may include database server devices DS storing data processed by the application server devices AS. The object cache server group 2230 may include object cache server devices OCS temporarily storing data stored in or read from the database server devices DS, and accordingly, may perform functions as a cache between the application server devices AS and the database server devices DS.

According to another embodiment of the invention, the object cache server devices OCS may be embodied by using the embodiments described above with reference to FIGS. 1 through 18. In detail, the object cache server devices OCS may each include NVM and a controller, and the controller may include a memory, for example, SRAM. Each of the object cache server devices OCS may periodically or intermittently monitor error bits generated in the memory included in the controller, and dynamically determine a buffer memory or a rewrite cycle with respect to a read-only memory based on a monitoring result.

Figure 21:
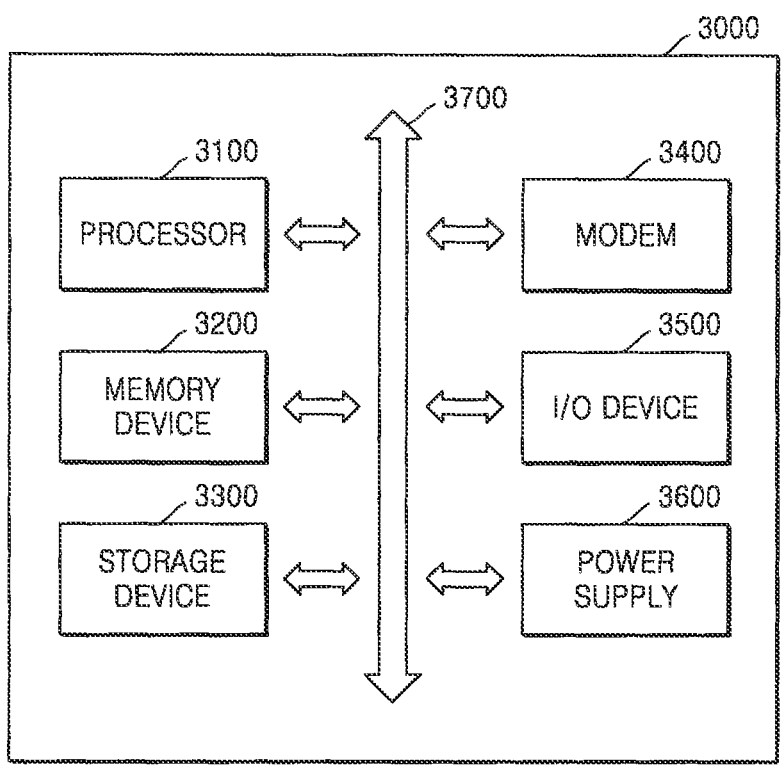
FIG. 21 is a diagram of an electronic device according to an embodiment of the invention.

FIG. 21 is a diagram of an electronic device 3000 according to an embodiment. Referring to FIG. 21, the electronic device 3000 may include a processor 3100, a memory device 3200, a storage device 3300, a modem 3400, an I/O device 3500, and a power supply 3600, which are connected to each other through a bus 3700. According to an embodiment, the storage device 3300 may be embodied by using the embodiments described above with reference to FIGS. 1 through 18. In detail, the storage device 3300 may include NVM and a controller, and the controller may include a memory, such as SRAM. The storage device 3300 may periodically or intermittently monitor error bits generated in the memory included in the controller, and dynamically determine a buffer memory or a rewrite cycle with respect to a read-only memory based on a monitoring result.

While the inventive concept has been particularly shown and described with reference to embodiments thereof, it will be understood that various changes in form and details may be made therein without departing from the spirit and scope of the following claims.

What is claimed is:

1. A solid state drive (SSD) comprising: a nonvolatile memory; and a SSD controller configured to write data to the nonvolatile memory or read data from the nonvolatile memory, said SSD controller comprising: a processor configured to include a central processing unit (CPU) or a micro-processor, and control overall operations of the SSD controller; a host interface between a host and the SSD controller; a nonvolatile memory (NVM) interface configured to exchange data between the SSD controller and the nonvolatile memory; a dynamic random-access memory (DRAM) controller for controlling a DRAM buffer provided outside the SSD controller and nonvolatile memory; a static random-access memory (SRAM) buffer configured to buffer write data to be written on the nonvolatile memory or read data read from the nonvolatile memory; an error-correction code (ECC) module configured to check and correct errors in the write data or the read data buffered in the SRAM buffer; a monitoring module configured to monitor the number of data error bits generated in the SRAM buffer based on an error corrected by the ECC module; and a buffer manager configured to compare the number of data error bits received from the monitoring module to a threshold number of data error bits, to thereby generate a data error bit comparison result and determine the SRAM buffer or the DRAM buffer as a buffer memory for the write data or the read data based on the data error bit comparison result; and wherein, during an operation to write data into the nonvolatile memory, the SSD controller is configured to at least temporarily modify a write data path for the write data by redirecting remaining portions of the write data through the DRAM buffer as a substitute for the SRAM buffer when the number of data error bits associated with the SRAM buffer is higher than the threshold number of data error bits, as determined by the buffer manager in response to a corresponding write request issued by the host; wherein, during an operation to read data from the nonvolatile memory, the SSD controller is configured at least temporarily modify a read data path for the read data by redirecting remaining portions of the read data through the DRAM buffer as the substitute for the SRAM buffer when the number of data error bits associated with the SRAM buffer is higher than the threshold number of data error bits, as determined by the buffer manager in response to a corresponding read request issued by the host; wherein the SSD controller is configured to support modification of the write data path in response to each write request issued by the host, such that each corresponding write command issued by the SSD controller to the nonvolatile memory is associated with a corresponding write data path through either the DRAM buffer or the SRAM buffer based on a corresponding data error bit comparison result; and wherein the SSD controller is configured to support modification of the read data path in response to each read request issued by the host, such that each corresponding read command issued by the SSD controller to the nonvolatile memory is associated with a corresponding read data path through either the DRAM buffer or the SRAM buffer based on the corresponding data error bit comparison result.

2. The SSD of claim 1, wherein the SSD controller is further configured to determine the SRAM buffer as the buffer memory when the number of data error bits is lower than the threshold number, and determine the DRAM buffer as the buffer memory when the number of data error bits is equal to or higher than the threshold number of data error bits.

3. The SSD of claim 1, wherein the SSD controller is further configured to monitor an input/output speed of the write data or the read data, and dynamically determine the buffer memory based on the input/output speed.

4. The SSD of claim 3, wherein the buffer manager is further configured to compare the input/output speed to a threshold speed, determine the SRAM buffer as the buffer memory when the input/output speed is lower than the threshold speed, and determine the DRAM buffer as the buffer memory when the input/output speed is equal to or higher than the threshold speed.

5. The SSD of claim 1, wherein the monitoring module is further configured to monitor a generation frequency of data error bits generated in the SRAM buffer based on the errors corrected by the ECC module.

6. The SSD of claim 5, wherein the buffer manager is further configured to compare the generation frequency of data error bits received from the monitoring module to a threshold frequency and determine the SRAM buffer or the DRAM buffer, as the buffer memory for the write data or the read data based on a generation frequency comparison result.

7. The SSD of claim 6, wherein the SSD controller is further configured to determine the SRAM buffer as the buffer memory when the generation frequency of data error bits is lower than the threshold frequency, and determine the DRAM buffer as the buffer memory when the generation frequency of data error bits is equal to or higher than the threshold frequency.

8. The SSD of claim 6, wherein the SSD controller is further configured to redirect at least some of the write data through the DRAM buffer as the substitute for the SRAM buffer when the generation frequency of the data error bits associated with the SRAM buffer is higher than the threshold frequency.

9. The SSD of claim 8, wherein the SSD controller is further configured to redirect at least some of the read data through the DRAM buffer as the substitute for the SRAM buffer when the generation frequency of data error bits associated with the SRAM buffer is higher than the threshold frequency.

10. The SSD of wherein, during the operation to write data into the nonvolatile memory, the SSD controller is configured to modify the path for the write data again by redirecting remaining portions of the write data through the SRAM buffer as the substitute for the DRAM buffer when the number of data error bits associated with the SRAM buffer is lowered to less than the threshold number; and wherein, during the operation to read data from the nonvolatile memory, the SSD controller is configured modify the path for the read data again by redirecting remaining portions of the read data through the SRAM buffer as the substitute for the DRAM buffer when the number of data error bits associated with the SRAM buffer is lowered to less than the threshold number of data error bits.

11. A method of operating a solid state drive (SSD) including a nonvolatile memory and a SSD controller configured to control the nonvolatile memory, the method comprising: monitoring, by the SSD controller, a number of data error bits generated in a static random-access memory (SRAM) buffer included within the SSD controller; comparing, by the SSD controller, the number of data error bits to a threshold value to thereby generate a data error bit comparison result; determining a buffer memory between the SRAM buffer within the SSD controller and a dynamic random-access memory (DRAM) buffer provided outside the SSD controller and the nonvolatile memory based on the data error bit comparison result, modified buffering, on the DRAM buffer, of write data to be written into the nonvolatile memory or read data to be read from the nonvolatile memory when the number of data error bits is equal to or higher than the threshold value; and default buffering, on the SRAM buffer, of the write data or the read data when the number of data error bits is lower than the threshold value; wherein remaining portions of the write data to be provided to the nonvolatile memory and/or remaining portions of the read data read from the nonvolatile memory are redirected through the DRAM buffer as a substitute for the SRAM buffer, during said modified buffering; wherein the remaining portions of the write data include a plurality of sub-portions of the write data associated with respective write requests issued by a host to the SSD controller and wherein the SSD controller evaluates each write request with a corresponding data error bit comparison result prior to issuing a corresponding write command to the nonvolatile memory, which is associated with a corresponding default buffering or modified buffering; and wherein the remaining portions of the read data include a second plurality of sub-portions of the read data associated with respective read requests issued by the host to the SSD controller and wherein the SSD controller evaluates each read request with the corresponding data error bit comparison result prior to issuing a corresponding read command to the nonvolatile memory, which is associated with the corresponding default buffering or modified buffering.

12. The method of claim 11, wherein, in the monitoring, the number of data error bits is monitored by comparing data input to the SRAM buffer to data output from the SRAM buffer.

13. The method of claim 11, further comprising performing an error check and correction operation on data buffered into the SRAM buffer, wherein, in the monitoring, the number of data error bits is monitored based on an error corrected via the error check and correction operation.

14. The method of claim 11, further comprising:
monitoring an input/output speed of the write data or the read data; and dynamically determining, as the SRAM buffer or DRAM buffer, the buffer for buffering the write data or the read data based on the input/output speed.

15. The method of claim 11, wherein following said modified buffering, remaining portions of the write data to be provided to the nonvolatile memory and/or remaining portions of the read data read from the nonvolatile memory is redirected through the first buffer memory as the substitute for the second buffer memory, during a return to said default buffering.

* * * * *